(12) United States Patent
Chida

(10) Patent No.: US 9,300,469 B2
(45) Date of Patent: Mar. 29, 2016

(54) SECURE COMPUTING SYSTEM, SECURE COMPUTING METHOD, SECURE COMPUTING APPARATUS, AND PROGRAM THEREFOR

(75) Inventor: Koji Chida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1161 days.

(21) Appl. No.: 12/812,916

(22) PCT Filed: Jan. 21, 2009

(86) PCT No.: PCT/JP2009/050857
§ 371 (c)(1),
(2), (4) Date: Oct. 28, 2010

(87) PCT Pub. No.: WO2009/093603
PCT Pub. Date: Jul. 30, 2009

(65) Prior Publication Data

US 2011/0040963 A1    Feb. 17, 2011

(30) Foreign Application Priority Data

Jan. 21, 2008    (JP) ................................. 2008-010928
Jan. 21, 2008    (JP) ................................. 2008-010929

(51) Int. Cl.
| | |
|---|---|
| *H04L 29/06* | (2006.01) |
| *H04L 9/30* | (2006.01) |
| *H04L 9/32* | (2006.01) |

(52) U.S. Cl.
CPC ................ *H04L 9/30* (2013.01); *H04L 9/3221* (2013.01); *H04L 2209/12* (2013.01); *H04L 2209/16* (2013.01); *H04L 2209/50* (2013.01)

(58) Field of Classification Search
CPC ....... H04L 9/00; H04L 9/0618; H04L 9/3228; H04L 63/0407; H04L 63/0421; H04L 2209/16; H04L 2209/12; H04M 2201/10; H03K 5/22; H03K 19/003; H03K 19/002; G06F 7/00; G06F 17/5022
USPC ........................................................... 713/150
See application file for complete search history.

(56) References Cited

U.S. PATENT DOCUMENTS 4,656,633 A * 4/1987 Todd ............................. 714/808
5,295,188 A * 3/1994 Wilson et al. ................... 380/30

(Continued)

OTHER PUBLICATIONS

Marc Fischlin, "Universally Composable Oblivious Transfer in the Multi-party Setting", Topics in Cryptology—CT-RSA AX 2006: The Cryptographers' Track at the RSA Conference 2006, XP-019026791, Feb. 13-17, 2006, pp. 332-349.*

(Continued)

*Primary Examiner* — Krista Zele
*Assistant Examiner* — Tariq Najee-Ullah
(74) *Attorney, Agent, or Firm* — Oblon, McClelland, Maier & Neustadt, L.L.P.

(57) ABSTRACT

A third secure computing apparatus generates data Wb associated with each bit b of a segment t that satisfies a relation $m_A = s*t$ for a first input value $m_A$ and an operator * and data W(1-b) associated with an inversion bit (1-b) of the bit b, transmits the data Wb to a first secure computing apparatus, and transmits data W including the data Wb and the data W(1-b) to a second secure computing apparatus. The second secure computing apparatus uses a segment s that satisfies the relation $m_A = s*t$, a logic circuit function f and the data W to generate data T in which a logic circuit function f(s*X), which is the logic circuit function f in which the segment s is substituted, is concealed, and transmits the data T to the first secure computing apparatus. A computation result $f(m_A)$ can be determined from the data T and the data Wb. The first secure computing apparatus obtains the computation result $f(m_A)$ using the data T and the data Wb.

16 Claims, 16 Drawing Sheets

(56) References Cited

U.S. PATENT DOCUMENTS

| | | | | |
|---|---|---|---|---|
| 6,834,272 | B1* | 12/2004 | Naor et al. | 705/80 |
| 6,990,468 | B1* | 1/2006 | Berson et al. | 705/52 |
| 7,003,448 | B1* | 2/2006 | Lauber et al. | 704/200.1 |
| 7,181,017 | B1* | 2/2007 | Nagel et al. | 380/282 |
| 7,290,150 | B2* | 10/2007 | Agrawal et al. | 713/193 |
| 7,685,115 | B2* | 3/2010 | Avidan et al. | 707/999.004 |
| 7,844,496 | B2* | 11/2010 | Algesheimer et al. | 705/26.1 |
| 8,024,274 | B2* | 9/2011 | Parkes et al. | 705/64 |
| 8,041,706 | B2* | 10/2011 | Agrawal et al. | 707/714 |
| 8,132,006 | B2* | 3/2012 | Ramzan et al. | 713/168 |
| 8,271,796 | B2* | 9/2012 | Diamond | 713/180 |
| 8,311,213 | B2* | 11/2012 | Rane et al. | 380/28 |
| 8,416,955 | B2* | 4/2013 | Rane et al. | 380/278 |
| 8,526,621 | B2* | 9/2013 | Rabin et al. | 380/282 |
| 8,539,220 | B2* | 9/2013 | Raykova et al. | 713/150 |
| 8,549,290 | B2* | 10/2013 | Nishimaki et al. | 713/167 |
| 2004/0225570 | A1* | 11/2004 | Algesheimer et al. | 705/26 |
| 2004/0250100 | A1* | 12/2004 | Agrawal et al. | 713/193 |
| 2005/0160273 | A1* | 7/2005 | Oishi | H04L 63/062 713/180 |
| 2005/0247779 | A1* | 11/2005 | Ohkubo et al. | 235/383 |
| 2007/0014396 | A1* | 1/2007 | Miyauchi et al. | 380/28 |
| 2007/0192622 | A1* | 8/2007 | Futa | G06F 7/723 713/189 |
| 2008/0208560 | A1* | 8/2008 | Johnson et al. | 703/22 |
| 2009/0182667 | A1* | 7/2009 | Parkes et al. | 705/50 |
| 2009/0282039 | A1* | 11/2009 | Diamond | 707/6 |
| 2010/0150349 | A1* | 6/2010 | Choi et al. | 380/256 |
| 2011/0211692 | A1* | 9/2011 | Raykova | H04L 9/008 380/46 |

OTHER PUBLICATIONS

Office Action issued Oct. 8, 2012 in European Patent Application No. 09 703 675.0.

Extended European Search Report issued Feb. 20, 2012, in European Patent Application No. 09703675.0.

Marc Fischlin, "Universally Composable Oblivious Transfer in the Multi-party Setting", Topics in Cryptology—CT-RSA 2006: The Cryptographers' Track at the RSA Conference 2006, XP-019026791, Feb. 13-17, 2006, pp. 332-349.

Shinmyo, Urara et al., "Fingerprinting Protocol Based on Distributed Providers Using Oblivious Transfer", The $28^{th}$ Symposium on Information Theory and Its Applications (SITA 2005), vol. II of II, p. 705-708, (Nov. 20, 2005).

Crepeau, Claude et al., "Committed Oblivious Transfer and Private Multi-Party Computation", Lecture Notes in Computer Science, (Received), vol. 963, pp. 110-123, Advances in Cryptology-Crypto'95, (Oct. 16, 1995).

Ghodosi, Hossein et al., "Comments on the 'm out of n oblivious transfer'", Information Processing Letters, vol. 97, No. 4, p. 153-155, (Feb. 28, 2006).

Chida, Koji et al., "Privacy Preserving Computations without Public Key Cryptographic Operation", LNCS (Received), vol. 5312, pp. 184-200, Advances in Information and Computer Security Its Slides, (Feb. 24, 2009).

Yao Chi-Chih, Andrew "How to generate and exchange secrets", FOCS, IEEE, pp. 162-167, (1986).

Even, Shimon et al., "A randomized protocol for signing contracts", Communications of the ACM, vol. 28, No. 6, pp. 637-647, (Jun. 1985).

Naor, Moni et al., "Privacy Preserving Auctions and Mechanism Design", ACM, pp. 129-139, (1999).

Malkhi, Dahlia et al., "Fairplay-A Secure Two-Party Computation System", Proceedings of the $13^{th}$ USENIX Security Symposium, pp. 287-302, (2004).

Koji Chida and Katsumi Takahashi, "Privacy Preserving Computations without Public Key Cryptographic Operation," NTT Corporation, Tokyo, Japan, IWSEC 2008, LNCS 5312, pp. 184-200, 2008.

Koji Chida and Katsumi Takahashi, Privacy Preserving Computations without Public Key Cryptographic Operation,' Information Sharing Platform Laboratories, NTT Corporation, Mar. 9, 2011, Midori-cho, Masashino, 180-8585, Japan, pp. 1-6.

* cited by examiner

BACKGROUND ART

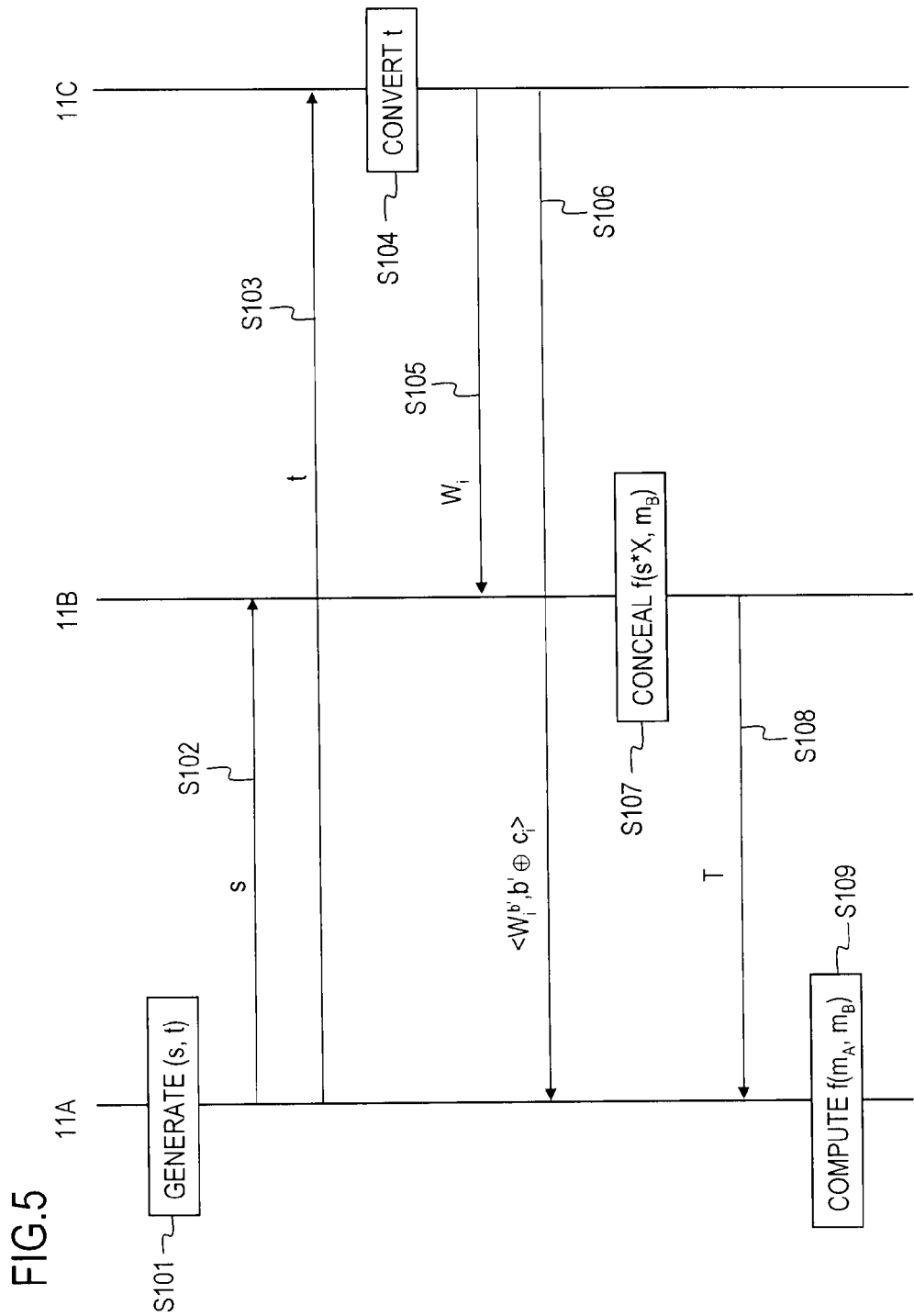

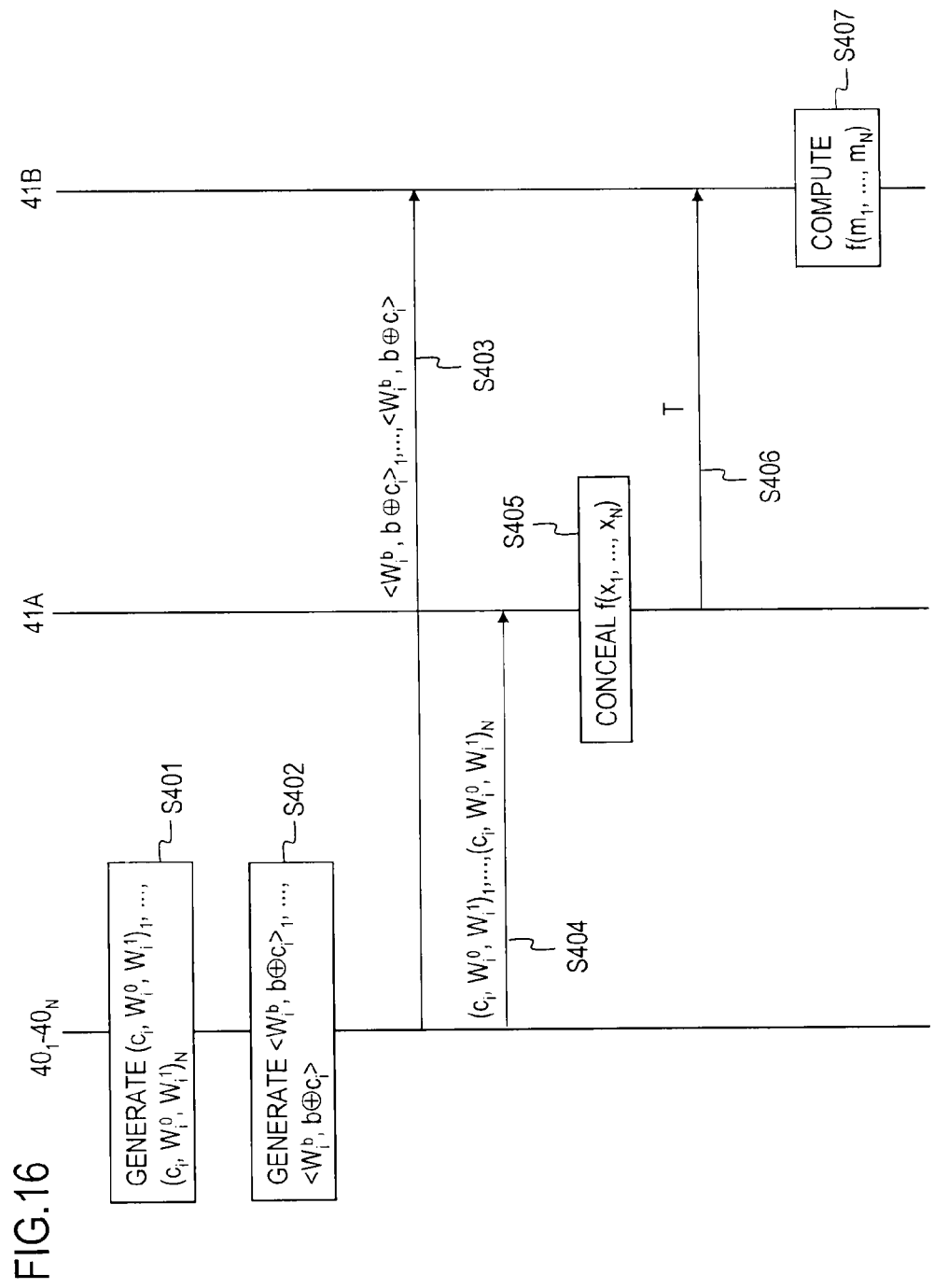

SECURE COMPUTING SYSTEM, SECURE COMPUTING METHOD, SECURE COMPUTING APPARATUS, AND PROGRAM THEREFOR

TECHNICAL FIELD

The present invention relates to an encryption application technique. In particular, it relates to a technique of providing a computation result for an input value while concealing the input value.

BACKGROUND ART

Non-patent literature 1 discloses an art of providing a computation result while concealing an input value. FIG. 1 is a block diagram showing a configuration of a secure computing system based on the art disclosed in Non-patent literature 1. Referring to FIG. 1, the secure computing system has a secure computing apparatus 81A and a secure computing apparatus 81B.

The secure computing apparatus 81A retains a logic circuit function $f(x, y)$ and a bit string $m_A$, which is to be substituted for x of the logic circuit function. The secure computing apparatus 81B retains the logic circuit function $f(x, y)$ and a bit string $m_B$, which is to be substituted for y of the logic circuit function.

The secure computing apparatuses 81A and 81B communicate with each other, and either or both of the secure computing apparatuses 81A and 81B obtain the computation result $f(m_A, m_B)$ of the logic circuit function $f(x, y)$. However, the secure computing apparatus 81A obtains no data from which the bit string $m_B$ can be readily reconstructed, and the secure computing apparatus 81B obtains no data from which the bit string $m_A$ can be readily reconstructed.

Note that the logic circuit function $f(x, y)$ can be implemented as a combination of one or more logic gates g. A logic gate g performs a predetermined logic computation on one or two input bits and outputs one bit representing the computation result. The example of the logic gate may be the AND gate or the OR gate. Input and output sequences of each logic gate g are referred to as a wire. A wire on the input side is referred to as an input wire, and a wire on the output side is referred to as an output wire.

The method disclosed in Non-patent literature 1 will be summarized below. As an example, a procedure by which the secure computing apparatus 81A obtains the computation result $f(m_A, m_B)$ will be described.

[Step C-1]

The secure computing apparatus 81B, which retains the logic circuit function $f(x, y)$ and the bit string $m_B$ to be substituted for y, conceals the logic circuit function $f(x, y)$ by concealing a truth table for each logic gate constituting the logic circuit function $f(x, y)$.

The following is a truth table for a logic gate. In the case of the AND gate, $g(0, 0)=g(0, 1)=g(1, 0)=0$, and $g(1, 1)=1$.

| Input wire: | Output wire |
| --- | --- |
| 0, 0: | g(0, 0) |
| 0, 1: | g(0, 1) |
| 1, 0: | g(1, 0) |
| 1, 1: | g(1, 1) |

To conceal a logic gate, the secure computing apparatus 81B associates each input wire and each output wire with a pair of a fixed-length random number, which is associated with the value of the wire, and a random bit, which is associated with the value of the wire. Then, the truth table is reconstructed using the associated pairs of a fixed-length random number and a random bit to conceal the truth table. However, this is not sufficient because even a person who does not know the association between the value of each wire and the pair of a fixed-length random number and a random bit can estimate the logic gate from the pair of a fixed-length random number and a random bit associated with the output wire. Thus, a pseudo-random function is applied to enhance the concealing. In this way, the logic gate can be concealed. Then, the remaining logic gates of the logic circuit function $f(x, m_B)$ can be concealed in the same way, thereby concealing the logic circuit function $f(x, m_B)$.

More specifically, the secure computing apparatus 81B performs the following steps (a) to (d) to conceal the logic circuit function $f(x, m_B)$.

(a) The secure computing apparatus 81B generates fixed-length random numbers $$W_i^0, W_i^1$$

for each wire i for the logic circuit function $f(x, m_B)$ and associates the random numbers with 0 and 1, respectively.

(b) Then, the secure computing apparatus 81B generates a random bit $c_i \in \{0, 1\}$. The random bit $c_i$ is used as a randomized label.

(c) Then, the secure computing apparatus 81B associates $$\langle W_i^0, c_i \rangle, \langle W_i^1, \bar{c}_i \rangle$$

with the wire i. In this expression, $$\bar{c}=1-c.$$

Note that $\langle \alpha, \beta \rangle$ means that $\alpha$ is associated with $\beta$.

(d) Then, for a logic gate g that receives input wires i and j and provides an output wire k, the secure computing apparatus 81B generates four pieces of labeled data $$c_i, c_j : (W_k^{g(0,0)}, g(0,0) \oplus c_k) \oplus F_{W_i^0}(c_j) \oplus F_{W_j^0}(c_i),$$

$$c_i, \bar{c}_j : (W_k^{g(0,1)}, g(0,1) \oplus c_k) \oplus F_{W_i^0}(\bar{c}_j) \oplus F_{W_j^1}(c_i),$$

$$\bar{c}_i, c_j : (W_k^{g(1,0)}, g(1,0) \oplus c_k) \oplus F_{W_i^1}(c_j) \oplus F_{W_j^0}(\bar{c}_i),$$

$$\bar{c}_i, \bar{c}_j : (W_k^{g(1,1)}, g(1,1) \oplus c_k) \oplus F_{W_i^1}(\bar{c}_j) \oplus F_{W_j^1}(\bar{c}_i),$$

and arranges the four pieces of labeled data in a random order to generate data $T_g$. In this expression, the left side of the colon represents a label, the right side of the colon represents data, and $F_W(x)$ represents a function that receives x and W and outputs a fixed-length random number that is uniquely determined for a pair of x and W (a pseudo-random function).

$$\alpha \oplus \beta$$

represents an exclusive OR of $\alpha$ and $\beta$.

$$(\alpha, \beta) \oplus \gamma$$

represents an exclusive OR of a bit concatenated value $\alpha | \beta$ and $\gamma$, where $\alpha | \beta$ represents the bit concatenated value of $\alpha$ and $\beta$.

The random bit $c_k$ of the data $T_g$ associated with the last-stage gate g of the logic circuit function f is set at 0.

The data $T_g$ described above is generated for each gate of the logic circuit function $f(x, m_B)$, and a set T of the generated data $T_g$ is transmitted to the secure computing apparatus 81A as concealing data for the logic circuit function $f(x, m_B)$.

[Step C1-2]

The secure computing apparatus 81A, which retains the bit string $m_A$ to be substituted for x, performs a 1-out-of-2 oblivious transfer protocol with the secure computing apparatus 81B. As a result, the secure computing apparatus 81A obtains data $$\langle W_i^b, b \oplus c_i \rangle,$$

associated with an input wire that is a bit $b \in \{0, 1\}$ of the bit string $m_A$.

[Step C1-3]

Then, using the data $T_g$ received from the secure computing apparatus 81B and $$\langle W_i^b, b \oplus c_i \rangle,$$

the secure computing apparatus 81A computes the output wire $$\langle W_k^{\hat{b}}, \hat{b} \oplus c_k \rangle$$

of the last logic gate g of the logic circuit function f.

[Step C1-4]

Furthermore, from $$\langle W_k^{\hat{b}}, \hat{b} \oplus c_k \rangle,$$

the secure computing apparatus 81A obtains a bit $$\hat{b}$$

of the computation result $f(m_A, m_B)$.

[Details of Step C1-3]

In step C1-3 in the procedure described above, when the data $T_g$ associated with the gate that receives the input wires i and j and provides the output wire k and $$\langle W_i^b, b \oplus c_i \rangle, \langle W_j^d, d \oplus c_j \rangle (d \in \{0,1\}) \qquad (1)$$

are given, the secure computing apparatus 81A first retrieves data $$(W_k^{g(b,d)}, g(b,d) \oplus c_k) \oplus F_{W_i^b}(d \oplus c_j) \oplus F_{W_j^d}(b \oplus c_i) \qquad (2)$$

associated with the label $$(b \oplus c_i, d \oplus c_j)$$

from the data $T_g$. In addition, the secure computing apparatus 81A computes $$F_{W_i^b}(d \oplus c_j) \oplus F_{W_j^d}(b \oplus c_i). \qquad (3)$$

The secure computing apparatus 81A performs an exclusive-OR operation of the formulas (2) and (3), thereby obtaining data $$(W_k^{g(b,d)}, g(b,d) \oplus c_k) \qquad (4)$$

associated with the output wire. Then, for example, the secure computing apparatus 81A uses the data associated with the output wire as data for an input wire of another logic gate and performs the same processing for the remaining logic gates to eventually obtain the output wire of the last-stage logic gate g of the logic circuit function f.

[Details of Step C1-4]

Since the random bit $c_k$ of the data $T_g$ associated with the last-stage logic gate g of the logic circuit function f is set at 0, $$\langle (W_k^{\hat{b}}, \hat{b} \oplus c_k \rangle = \langle W_k^{\hat{b}}, \hat{b} \oplus 0 \rangle = \langle W_k^{\hat{b}}, \hat{b} \rangle.$$

Therefore, the secure computing apparatus 81A can obtain $$\hat{b}$$

in step C1-4.

As described above, according to the method described in Non-patent literature 1, the secure computing apparatuses 81A and 81B have to perform the 1-out-of-2 oblivious transfer protocol in the second step. The 1-out-of-2 oblivious transfer protocol is characterized in that, when the secure computing apparatus 81B retains data $d_0$ and $d_1$, and the secure computing apparatus 81A retains a bit b, the secure computing apparatus 81A can obtain $d_b$ but cannot obtain $$d_{\bar{b}},$$

and the secure computing apparatus 81B cannot obtain the bit b. By using the protocol, leakage of the bit b of the bit string $m_A$ from the secure computing apparatus 81A to the secure computing apparatus 81B can be prevented, and at the same time, leakage of information about the logic circuit function $f(x, m_B)$ concealed in the data $T_g$ to the secure computing apparatus 81A can be prevented. For detailed information on the protocol, see Non-patent literature 2.

Non-patent literature 3 discloses another art of providing a computation result while concealing an input value. FIG. 2 is a block diagram showing a configuration of a secure computing system based on the art disclosed in Non-patent literature 3. Referring to FIG. 2, the secure computing system has a plurality of transforming apparatuses 90$_1$ to 90$_N$ and secure computing apparatuses 91A and 91B. The two secure computing apparatuses 91A and 91B form a secure computing apparatus group 91.

The secure computing apparatus group 91 formed by the secure computing apparatuses 91A and 91B uses data $m_n$ ($1 \leq n \leq N$) retained by the transforming apparatuses 90$_1$ to 90$_N$ to determine a computation result $f(m_1, \ldots, m_N)$ of a logic circuit function $f(x_1, \ldots, x_N)$ without obtaining data from which the input value $m_n$ can be readily reconstructed.

In the following, a procedure therefor will be summarized.

[Step C2-1]

First, the secure computing apparatus 91B performs the following steps (a) to (d) to conceal the logic circuit function f. Then, the secure computing apparatus 91B transmits data $T_g$ associated with the logic circuit function to the secure computing apparatus 91A as concealing data for the logic circuit function $f(x_1, \ldots, x_N)$.

(a) The secure computing apparatus 91B generates fixed-length random numbers $$W_i^0, W_i^1$$

for each wire i for the logic circuit function $f(x_1, \ldots, x_N)$ and associates the random numbers with 0 and 1, respectively.

(b) Then, the secure computing apparatus 91B generates a random bit $c_i \in \{0, 1\}$.

(c) Then, the secure computing apparatus 91B associates $$\langle W_i^0, c_i \rangle, \langle W_i^1, \bar{c}_i \rangle)$$

with the wire i. In this expression, $$\bar{c} = 1 - c.$$

(d) Then, for a logic gate g that receives input wires i and j and provides an output wire k, the secure computing apparatus 91B generates four pieces of labeled data $$c_i, c_j : (W_k^{g(0,0)}, g(0,0) \oplus c_k) \oplus F_{W_i^0}(c_j) \oplus F_{W_j^0}(c_i),$$

$$c_i, \bar{c}_j : (W_k^{g(0,1)}, g(0,1) \oplus c_k) \oplus F_{W_i^0}(\bar{c}_j) \oplus F_{W_j^1}(c_i),$$

$$\bar{c}_i, c_j : (W_k^{g(1,0)}, g(1,0) \oplus c_k) \oplus F_{W_i^1}(c_j) \oplus F_{W_j^0}(\bar{c}_i),$$

$$\bar{c}_i, \bar{c}_j : (W_k^{g(1,1)}, g(1,1) \oplus c_k) \oplus F_{W_i^1}(\bar{c}_j) \oplus F_{W_j^1}(\bar{c}_i),$$

and arranges the four pieces of labeled data in a random order to generate data $T_g$. A set T of the generated data $T_g$ is transmitted to the secure computing apparatus 91A as concealing data for the logic circuit function $f(x_1, \ldots, x_N)$.

[Step C2-2]

The transforming apparatuses 90$_1$ to 90$_N$ perform a proxy 1-out-of-2 oblivious transfer protocol with the secure computing apparatuses 91A and 91B to, thereby obtaining data $\langle W_i^b, b \oplus c_i \rangle$.

[Step C2-3]
Then, using the data $T_g$ and
$\langle W_i^b, b \oplus c_i \rangle$
the secure computing apparatus 91A obtains the output wire
$\langle W_k^b, \hat{b} \oplus c_k \rangle$
of the last-stage logic gate g of the logic circuit function f.

[Step C2-4]
Furthermore, from
$\langle W_k^b, \hat{b} \oplus c_k \rangle$
the secure computing apparatus 91A obtains a bit
$\hat{b}$
of the computation result $f(m_1, \ldots, m_N)$.

In step C2-2 in the procedure described above, the proxy 1-out-of-2 oblivious transfer protocol is used. This protocol is an extended version of the 1-out-of-2 oblivious transfer protocol. According to this protocol, on behalf of the transforming apparatuses $90_1$ to $90_N$, the secure computing apparatus 91A can compute
$\langle W_i^b, b \oplus c_i \rangle$
without knowing the bit b, which is information about data retained by the transforming apparatuses $90_1$ to $90_N$.

Non-patent literature 1: A. C. Yao, How to generate and exchange secrets, Proc. of FOCS '86, pp. 162 to 167, IEEE Press, 1986

Non-patent literature 2: S. Even, O. Goldreich and A. Lempel, A randomized protocol for signing contracts, Communications of the ACM, Vol. 28, No. 6, pp. 637 to 647, 1985

Non-patent literature 3: M. Naor, B. Pinkas, and R. Sumner, Privacy preserving auctions and mechanism design, Proc. of ACM EC '99, pp. 129 to 139, ACM Press, 1999

DISCLOSURE OF THE INVENTION

Problem to be Solved by the Invention

As described above, according to the method disclosed in Non-patent literature 1, the secure computing apparatuses 81A and 81B have to perform the 1-out-of-2 oblivious transfer protocol. According to the method disclosed in Non-patent literature 3, the transforming apparatuses $90_1$ to $90_N$ and the secure computing apparatuses 91A and 91B have to perform the 1-out-of-2 oblivious transfer protocol.

As reported in D. Malkhi, N. Nisan, B. Pinkas and Y. Sella, Fairplay—a secure two-party computation system, Proc. of USENIX Security Symposium, pp. 287 to 302, USENIX, 2004, in practice, the amount of computation involved with the 1-out-of-2 oblivious transfer protocol accounts for a large part of computation of the entire secure computing system.

The amount of computation required to perform the proxy 1-out-of-2 oblivious transfer protocol, which is an extended version of the 1-out-of-2 oblivious transfer protocol, is approximately the same as that of the 1-out-of-2 oblivious transfer protocol.

Therefore, in practice, if the amount of processing involved with these protocols can be reduced, the load on the secure computing system can be reduced.

Means to Solve the Problems

A first aspect of the present invention is implemented by a first secure computing apparatus, a second secure computing apparatus that stores a logic circuit function f, and a third secure computing apparatus.

The third secure computing apparatus generates data Wb associated with each bit b of a segment t that satisfies a relation $m_A = s*t$ for a first input value $m_A$ and an operator * and data W(1-b) associated with an inversion bit (1-b) of the bit b. The third computing apparatus transmits the data Wb to the first secure computing apparatus, and transmits data W including the data Wb and the data W(1-b) to the second secure computing apparatus without identifying the association between the bit b and the inversion bit (1-b) and the data Wb and the data W(1-b).

The second secure computing apparatus uses a segment s that satisfies the relation $m_A = s*t$, the logic circuit function f and the data W to generate data T in which a logic circuit function f(s*X), which is the logic circuit function f in which the segment s is substituted, is concealed. The computation result $f(m_A)$ can be determined from the data T and the data Wb. The second secure computing apparatus transmits the data T to the first secure computing apparatus.

The first secure computing apparatus receives the data T and the data Wb, and obtains the computation result $f(m_A)$ using the data T and the data Wb.

A second aspect of the present invention is implemented by a first secure computing apparatus that stores a logic circuit function f(x) and a second secure computing apparatus.

An input value m is divided into a segment A and a segment B, and the first secure computing apparatus receives the segment B. The first secure computing apparatus uses the logic circuit function f(x) and the segment B to generate data T in which the logic circuit function f(x) is concealed. A computation result f(m) can be determined from the data T and the segment A.

The second secure computing apparatus receives the segment A and the data T, and obtains the computation result f(m) using the segment A and the data T.

Effects of the Invention

According to the present invention, information about an input value of a logic circuit function f is divided into two segments, and the two segments are input to and processed by different secure computing apparatuses. As a result, the processing load involved with the 1-out-of-2 oblivious transfer protocol or the proxy 1-out-of-2 oblivious transfer protocol can be reduced, and as a result, the load on the secure computing apparatuses can be significantly reduced.

BRIEF DESCRIPTION OF THE DRAWINGS

FIG. 5 is a sequence diagram showing a specific example of an operation of the secure computing system according to the first embodiment;

FIG. 16 is a sequence diagram showing a specific example of an operation of the secure computing system according to the fourth embodiment.

Figure 1:
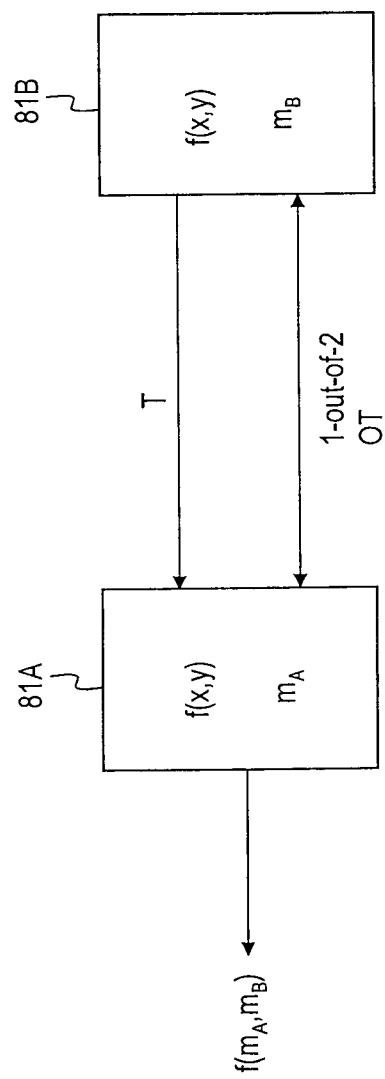
FIG. 1 is a block diagram showing a configuration of a secure computing system based on an art disclosed in Non-patent literature 1.
Figure 2:
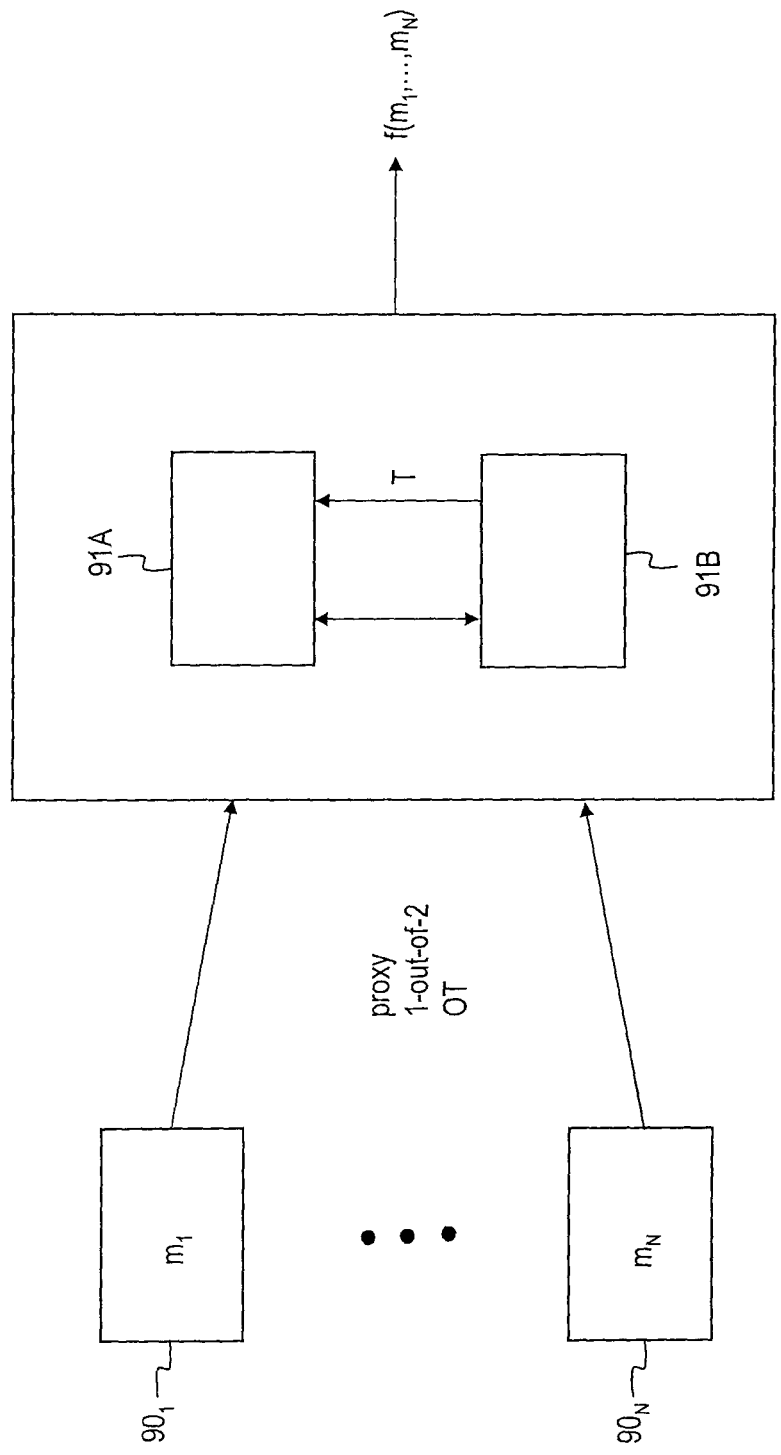
FIG. 2 is a block diagram showing a configuration of a secure computing system based on an art disclosed in Non-patent literature 3.

DESCRIPTION OF REFERENCE NUMERALS 1 to 4: secure computing system

BEST MODES FOR CARRYING OUT THE INVENTION

Embodiments of the present invention will be described in detail with reference to the drawings.

First Embodiment

A secure computing system according to a first embodiment comprises three secure computing apparatuses. Two of the secure computing apparatuses of the secure computing system retain their respective independent input values. The secure computing system according to this embodiment obtains a computation result of a logic circuit function f for the input values while preventing the input value retained by each secure computing apparatus from being known to the other secure computing apparatuses.

<Configuration>

Figure 3:
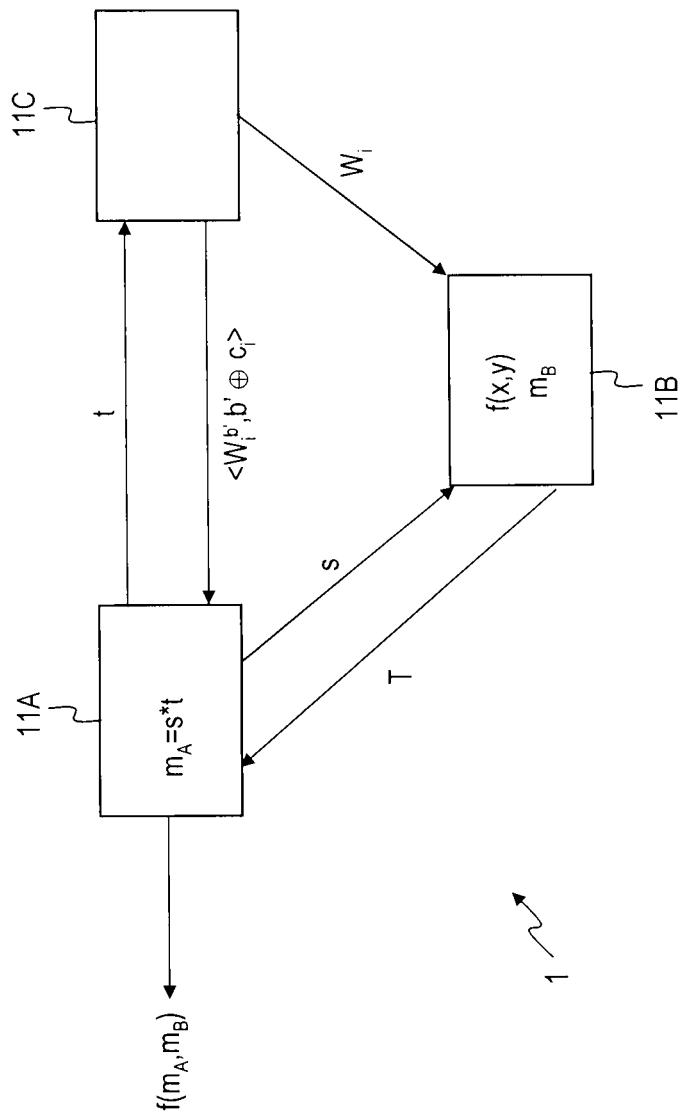
FIG. 3 is a block diagram showing a configuration of a secure computing system according to a first embodiment.
Figure 4A:
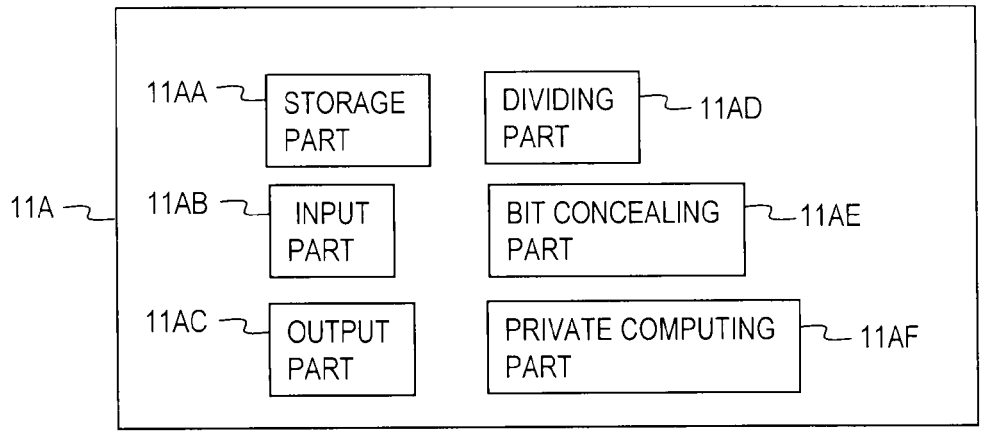
FIGS. 4A, 4B and 4C are block diagrams showing configurations of a secure computing apparatuses included in the secure computing system according to the first embodiment.
Figure 4B:
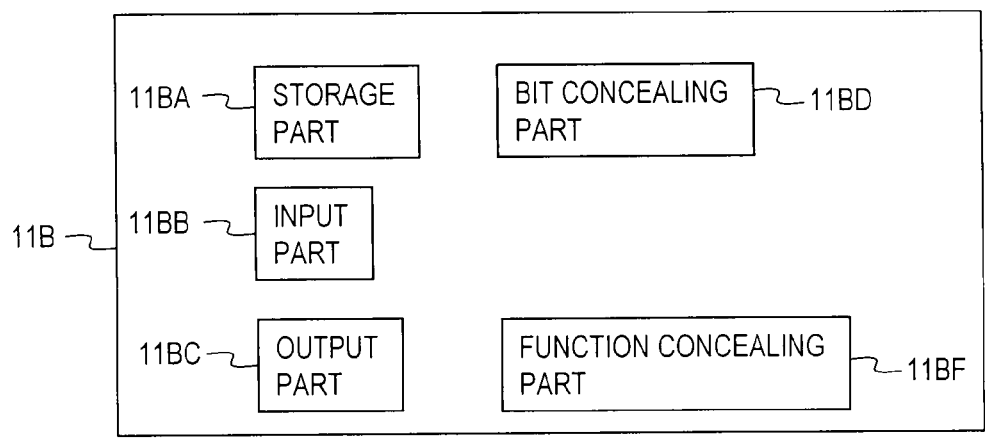
Figure 4C:
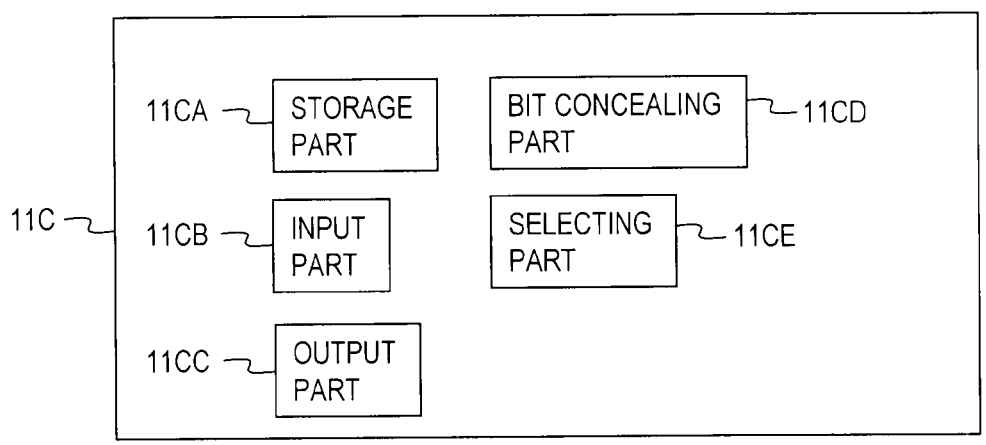

FIG. 3 is a block diagram showing a configuration of a secure computing system 1 according to the first embodiment. FIGS. 4A, 4B and 4C are block diagrams showing configurations of secure computing apparatuses 11A, 11B and 11C included in the secure computing system 1.

As shown in FIG. 3, the secure computing system 1 has the secure computing apparatuses 11A, 11B and 11C (a first, a second and a third secure computing apparatus).

As shown in FIG. 4A, the secure computing apparatus 11A has a storage part 11AA, an input part 11AB, an output part 11AC, a dividing part 11AD, a bit concealing part 11AE, and a secure computing part 11AF. As shown in FIG. 4B, the secure computing apparatus 11B has a storage part 11BA, an input part 11BB, an output part 11BC, a bit concealing part 11BD, and a function concealing part 11BF. As shown in FIG. 4C, the secure computing apparatus 11C has a storage part 11CA, an input part 11CB, an output part 11CC, a bit concealing part 11CD, and a selecting part 11CE.

The secure computing apparatuses 11A, 11B and 11C may be implemented by loading a predetermined program into a well-known computer comprising a central processing unit (CPU), a random-access memory (RAM), a read-only memory (ROM), a communication device, an input interface, an output interface and the like, for example. The secure computing apparatuses 11A, 11B and 11C may include an integrated circuit.

<Processing>

A processing according to this embodiment is an example of the first aspect of the present invention described earlier. In this embodiment, as a pre-processing, an input value $m_A$ is stored in the storage part 11AA of the secure computing apparatus 11A, and an input value $m_B$ and a logic circuit function f(x, y) are stored in the storage part 11BA of the secure computing apparatus 11B. The secure computing system according to this embodiment obtains a computation result $f(m_A, m_B)$ of the logic circuit function f(x, y) without letting the input value $m_A$ retained by the secure computing apparatus 11A be known to the other secure computing apparatuses and letting the input value $m_B$ retained by the secure computing apparatus 11B be known to the other secure computing apparatuses.

First, the secure computing apparatus 11A divides the input value $m_A$ into a segment s and a segment t that satisfy a relation $m_A=s*t$ for an operator * and transmits the segment s to the secure computing apparatus 11B and the segment t to the secure computing apparatus 11C (step E1-1).

The secure computing apparatus 11C generates data Wb associated with each bit b of the received segment t and data W(1-b) associated with an inversion bit (1-b) of each bit b. Then, the secure computing apparatus 11C transmits data W including the data Wb and the data W(1-b) to the secure computing apparatus 11B and the data Wb to the secure computing apparatus 11A without identifying the association between the bit b and the inversion bit (1-b) and the data Wb and the data W(1-b) (step E1-2).

Using the segment s, the logic circuit function f(x, y), the data W and the input value $m_B$, the secure computing apparatus 11B generates data T in which the logic circuit function $f(s*X, m_B)$ is concealed. The logic circuit function $f(s*X, m_B)$ is obtained by substituting the segment s and the input value $m_B$ into the logic circuit function f(x, y). From the data T and the data Wb, the computation result $f(m_A, m_B)$ of the logic circuit function f(x, y) for the input values $m_A$ and $m_B$ can be determined. The secure computing apparatus 11B transmits the data T to the secure computing apparatus 11A (step E1-3).

The secure computing apparatus 11A receives the data T and the data Wb. The secure computing apparatus 11A uses the data T and the data Wb to obtain the computation result $f(m_A, m_B)$ (step E1-4, 5).

In the following, a specific example of an operation of the secure computing system 1 according to this embodiment will be described.

FIG. 5 is a sequence diagram showing a specific example of an operation of the secure computing system 1 according to the first embodiment.

[Step E1-1]

In this example, the operator * is the exclusive-OR (XOR) operator. The dividing part 11AD in the secure computing apparatus 11A divides the input value $m_A$ stored in the storage part 11AA into random segments s and t that satisfy a relation $$m_A = s \oplus t$$

(step S101). Then, the output part 11AC in the secure computing apparatus 11A transmits the segment s to the secure computing apparatus 11B (step S102) and transmits the segment t to the secure computing apparatus 11C (step S103).

[Step E1-2]

For each input wire i associated with X of s*X, which equals to $m_A$, of the logic circuit function $f(s*X, m_B)$, the bit concealing part 11CD in the secure computing apparatus 11C generates data $$W_i = (\langle W_i^0, c_i \rangle, \langle W_i^1, \bar{c}_i \rangle),$$

which is a set of fixed-length random number data $W_i^0$ and a random bit $c_i$ and a set of fixed-length random number data $W_i^1$ and an inversion bit of the random bit $c_i$ (this data is a specific example of the data W).

From the data $W_i$ generated as described above, the selecting part 11CE selects a set $$\langle W_i^{b'}, b \oplus c_i \rangle$$

associated with each bit b' of the actual segment t (step S104). The bit b' is a w-th lowest bit of the segment t in the case where the input wire i is the w-th lowest bit of the segment t.

$$\langle W_i^{b'}, b \oplus c_i \rangle$$

is a specific example of the data Wb.

Then, the output part 11CC in the secure computing apparatus 11C transmits the data Wi to the secure computing apparatus 11B (step S105) and transmits $$\langle W_i^{b'}, b \oplus c_i \rangle$$

to the secure computing apparatus 11A (step S106).

[Step E1-3]

The secure computing apparatus 11B conceals the logic circuit function $f(s*X, m_B)$, which is obtained by substituting the segment s and the input value $m_B$ into the logic circuit function $f(x, y)$, by performing the following steps (a) to (d). The logic circuit function $f(s*X, m_B)$, which is obtained by substituting the segment s and the input value $m_B$ into the logic circuit function $f(x, y)$, is a function that includes a function $m_A = s*X$ for reconstructing $m_A$ from the input segment X=t and a logic circuit function $f(x, m_B)$, which is the logic circuit function in which the input value $m_B$ is substituted, and substitutes the output value $m_A$ of the function $m_A = s*X$ into the logic circuit function $f(x, m_B)$ to output the computation result $f(m_A, m_B)$. By the following procedure, each logic gate constituting the logic circuit function $f(x, m_B)$ is concealed.

(a) The bit concealing part 11BD in the secure computing apparatus 11B generates fixed-length random numbers $$W_i^0, W_i^1$$

for each wire i of the logic circuit function $f(s*X, m_B)$ and associates the fixed-length random numbers with 0 and 1, respectively. However, for a logic gate constituting the function $m_A = s*X$, an input wire that is a bit of the segment X=t is associated with $$W_i^0, W_i^1$$

received from the secure computing apparatus 11C.

(b) Then, the bit concealing part 11BD in the secure computing apparatus 11B generates a random bit $c_i$. However, for a logic gate constituting the function $m_A = s*X$, the random bit $c_i$ received from the secure computing apparatus 11C is used for an input wire of that is a bit of the segment X=t. Therefore, for the input wire that is a bit of the segment X=t, no random bit $c_i$ is newly generated.

(c) Furthermore, the bit concealing part 11BD in the secure computing apparatus 11B associates $$(\langle W_i^0, c_i \rangle, \langle W_i^1, \bar{c}_i \rangle)$$

with each wire i. However, a wire i associated with a w-th lowest bit of the segment s is associated with $$(\langle W_i^b, b \oplus c_i \rangle, \langle W_i^{\bar{b}}, \bar{b} \oplus c_i \rangle).$$

In this expression, b represents the w-th lowest bit of the segment s.

(d) Then, for each logic gate g that receives i and j as input wires and provides k as an output wire, the function concealing part 11BF in the secure computing apparatus 11B generates four pieces of labeled data $$c_i, c_j : (W_k^{g(0,0)}, g(0,0) \oplus c_k) \oplus F_{W_i^0}(c_j) \oplus F_{W_j^0}(c_i),$$

$$c_i, \bar{c}_j : (W_k^{g(0,1)}, g(0,1) \oplus c_k) \oplus F_{W_i^0}(\bar{c}_j) \oplus F_{W_j^1}(c_i),$$

$$\bar{c}_i, c_j : (W_k^{g(1,0)}, g(1,0) \oplus c_k) \oplus F_{W_i^1}(c_j) \oplus F_{W_j^0}(\bar{c}_i),$$

$$\bar{c}_i, \bar{c}_j : (W_k^{g(1,1)}, g(1,1) \oplus c_k) \oplus F_{W_i^1}(\bar{c}_j) \oplus F_{W_j^1}(\bar{c}_i),$$

and arranges the four pieces of labeled data in a random order to generate data $T_g$. A set T of the data $T_g$ is data in which the logic circuit function $f(s*X, m_B)$ is concealed (step S107). A random bit $c_k$ of the data $T_g$ associated with the last-stage gate g of the logic circuit function $f(s*X, m_B)$ is set at 0.

The output part 11BC in the secure computing apparatus 11B transmits the set T of the data $T_g$ to the secure computing apparatus 11A as data in which the logic circuit function $f(s*X, m_B)$ is concealed (step S108).

[Step E1-4]

The input part 11AB in the secure computing apparatus 11A receives the set T of the data $T_g$ and $$\langle W_i^{b'}, b \oplus c_i \rangle$$

Using the data $T_g$ and $$\langle W_i^{b'}, b \oplus c_i \rangle$$

the secure computing part 11AF in the secure computing apparatus 11A obtains the output wire $$\langle W_i^{\hat{b}}, \hat{b} \oplus c_i \rangle$$

of the last-stage logic gate g of the logic circuit function f.

[Step E1-5]

From $$\langle W_i^{\hat{b}}, \hat{b} \oplus c_i \rangle$$

the secure computing part 11AF in the secure computing apparatus 11A obtains a bit $$\hat{b}$$

of the computation result $f(m_A, m_B)$ (step S109).

[Details of Step E1-4]

In Step E1-4 in the procedure described above, when the data $T_g$ associated with the gate g that receives the input wires i and j and provides the output wire k and $$\langle W_i^{b'}, b \oplus c_i \rangle, \langle W_j^d, d \oplus c_j \rangle (d \in \{0,1\}) \quad (5)$$

are given to the secure computing part 11AF in the secure computing apparatus 11A, the secure computing part 11AF first extracts the label $$(b' \oplus c_i, d \oplus c_j)$$

and data $$(W_k^{g(b',d)}, g(b',d) \oplus c_k) \oplus F_{W_i^{b'}}(d \oplus c_j) \oplus F_{W_j^d}(b' \oplus c_i) \quad (6)$$

associated with the label from the data $T_g$. In addition, the secure computing part 11AF computes $$F_{W_j^{b'}}(d \oplus c_j) \oplus F_{W_j^d}(b' \oplus c_i) \quad (7)$$

The secure computing part 11AF performs an exclusive-OR operation of the formulas (6) and (7), thereby obtaining data $$(W_k^{g(b',d)}, g(b',d) \oplus c_k) \quad (8)$$

associated with the output wire. Then, for example, the secure computing part 11AF uses the data associated with the output wire as data for an input wire of another logic gate and performs the same processing for the remaining logic gates to eventually obtain the output wire of the last-stage logic gate g of the logic circuit function f.

[Details of Step E1-5]

Since the random bit $c_k$ of the data $T_g$ associated with the last-stage gate g of the logic circuit function $f(s^*X, m_B)$ is set at 0, $$\langle (W_k^{\hat{b}}, \hat{b} \oplus c_k) \rangle = \langle W_k^{\hat{b}}, \hat{b} \oplus 0 \rangle = \langle W_k^{\hat{b}}, \hat{b} \rangle.$$

Therefore, the secure computing part 11AF in the secure computing apparatus 11A can obtain $$\hat{b}.$$

As described above, according to this embodiment, none of the secure computing apparatuses 11A, 11B and 11C does not have to perform the 1-out-of-2 oblivious transfer protocol, which accounts for a large part of computation performed by the secure computing system according to the art described in Non-patent literature 1. Therefore, the load on the secure computing apparatuses 11A, 11B and 11C can be significantly reduced.

Since the secure computing apparatus 11C, which is added in this embodiment, receives only the segment t of the input value $m_A$, the secure computing apparatus 11C does not compromise the confidentiality of the input values $m_A$ and $m_B$.

Although XOR is used as an example of the operator * in this embodiment, the present invention is not limited thereto. The operator * may be any operator, such as the addition operator, the subtraction operator and the multiplication operator.

Second Embodiment

A second embodiment is a modification of the first embodiment. The second embodiment generally differs from the first embodiment in the following points.

In the first embodiment, the secure computing system comprises three secure computing apparatuses. In the second embodiment, a secure computing system comprises N transforming apparatuses (N represents a positive integer) and three secure computing apparatuses.

In the first embodiment, two secure computing apparatuses each retain an input value, and one of the secure computing apparatuses divides the input value into two segments. In the second embodiment, each transforming apparatus retains an independent input value and divides the input value into two segments.

<Configuration>

Figure 6:
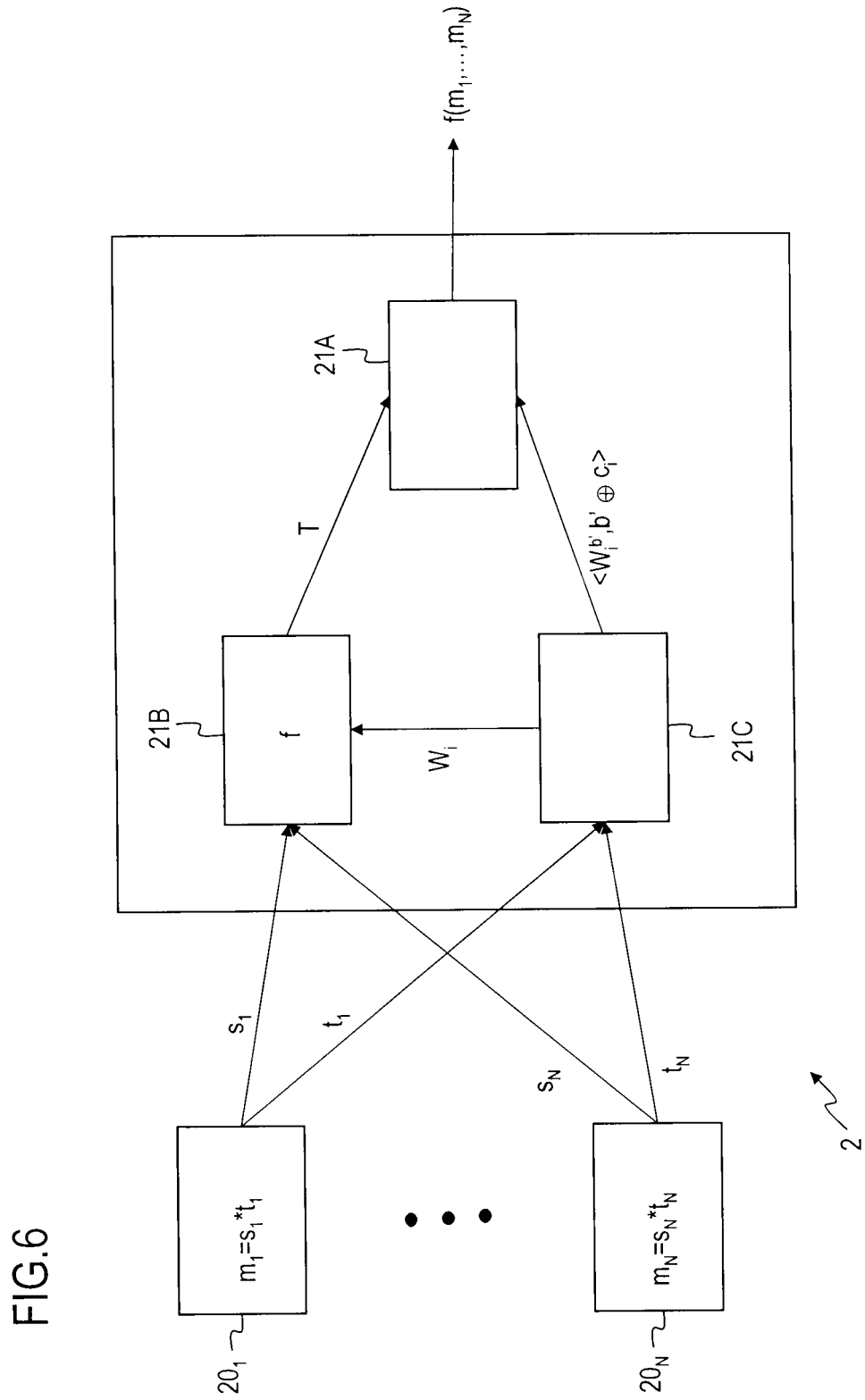
FIG. 6 is a block diagram showing a configuration of a secure computing system according to a second embodiment.
Figure 7A:
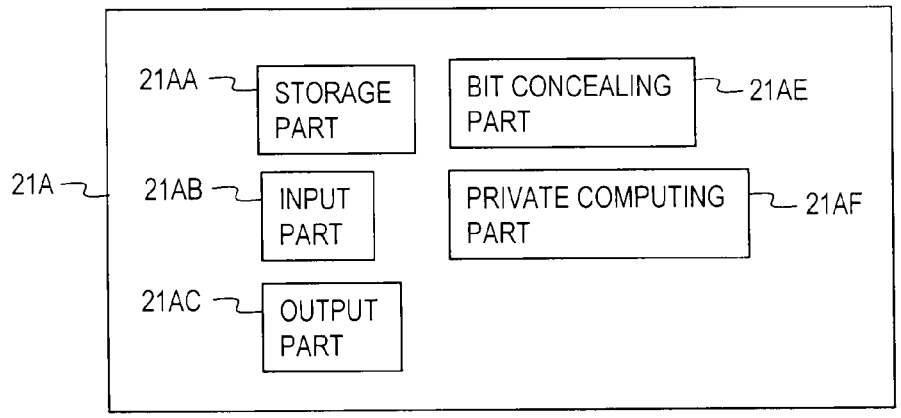
FIGS. 7A, 7B and 7C are block diagrams showing configurations of secure computing apparatuses included in the secure computing system according to the second embodiment.
Figure 7B:
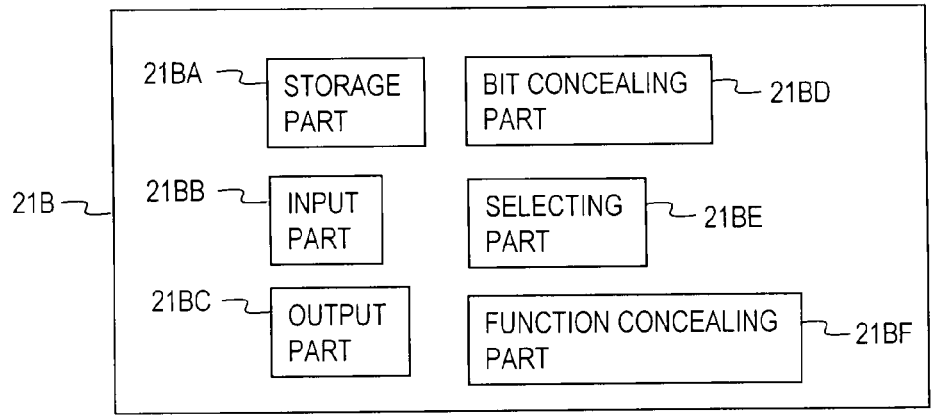
Figure 7C:
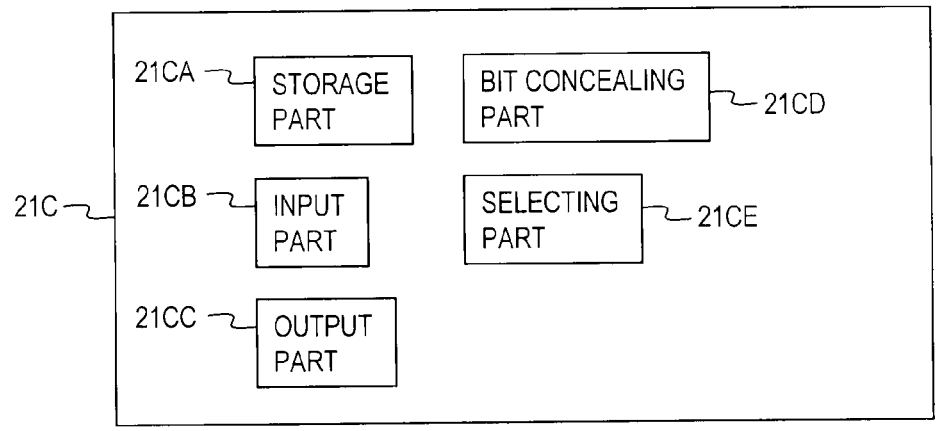
Figure 8:
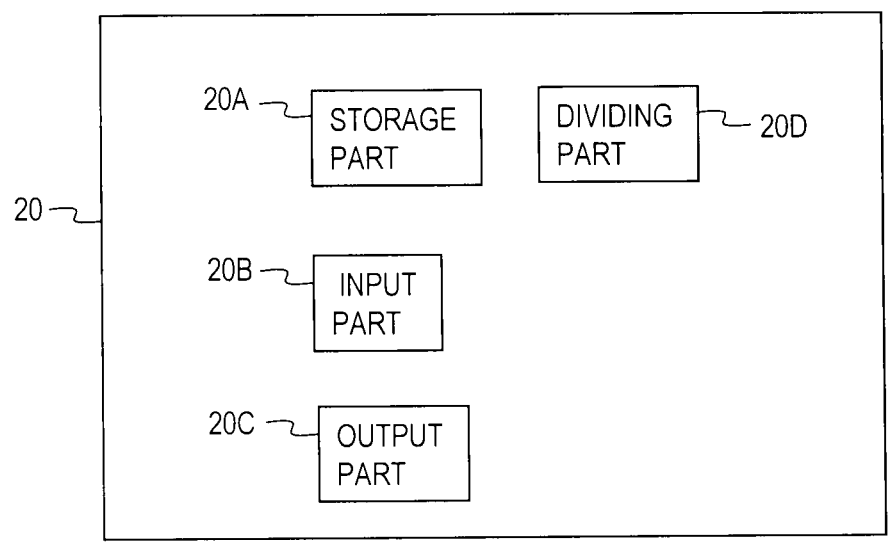
FIG. 8 is a block diagram showing a configuration of a transforming apparatus included in the secure computing system.

FIG. 6 is a block diagram showing a configuration of a secure computing system 2 according to the second embodiment. FIGS. 7A, 7B and 7C are block diagrams showing configurations of secure computing apparatuses 21A, 21B and 21C included in the secure computing system 2. FIG. 8 is a block diagram showing a configuration of a transforming apparatus 20 included in the secure computing system 2. Note that the transforming apparatus 20 is a representative of transforming apparatuses $20_1$ to $20_N$.

As shown in FIG. 6, the secure computing system 2 has the secure computing apparatuses 21A, 21B and 21C (a first, a second and a third secure computing apparatus).

As shown in FIG. 7A, the secure computing apparatus 21A has a storage part 21AA, an input part 21AB, an output part 21AC, a bit concealing part 21AE, and a secure computing part 21AF. As shown in FIG. 7B, the secure computing apparatus 21B has a storage part 21BA, an input part 21BB, an output part 21BC, a bit concealing part 21BD, a selecting part 21BE, and a function concealing part 21BF. As shown in FIG. 7C, the secure computing apparatus 21C has a storage part 21CA, an input part 21CB, an output part 21CC, a bit concealing part 21CD, and a selecting part 21CE. As shown in FIG. 8, each transforming apparatus 20 has a storage part 20A, an input part 20B, an output part 20C, and a dividing part 20D.

The secure computing apparatuses 21A, 21B and 21C and the transforming apparatus 20 may be implemented by loading a predetermined program into a well-known computer comprising a CPU, a RAM, a ROM, a communication device, an input interface, an output interface and the like, for example. The secure computing apparatuses 21A, 21B and 21C and the transforming apparatus 20 may include an integrated circuit.

<Processing>

A processing according to this embodiment is an example of the first aspect of the present invention described earlier.

In this embodiment, as a pre-processing, input values $m_1$ to $m_N$ are stored in the storage part 20A of the transforming apparatuses $20_1$ to $20_N$, and a logic circuit function $f(x_1, \ldots, x_N)$ is stored in the storage part 21BA of the secure computing apparatus 21B. The secure computing system 2 according to this embodiment obtains a computation result $f(m_1, \ldots, m_N)$ of the logic circuit function $f(x_1, \ldots, x_N)$ for input values $m_n$ ($1 \leq n \leq N$) without letting the input values $m_1$ to $m_N$ retained by the transforming apparatuses $20_1$ to $20_N$ be known to the other apparatuses. In this process, the secure computing apparatuses 21A, 21B and 21C obtain the computation result $f(m_1, \ldots, m_N)$ without reconstructing the input values $m_n$, and obtaining data from which the input values $m_n$ can be easily reconstructed.

First, the transforming apparatus $20_1$ divides the input value $m_1$ into a segment $s_1$ and a segment $t_1$ that satisfy a relation $m_1 = s_1 * t_1$ for an operator * and transmits the segment $s_1$ to the secure computing apparatus 21B and the segment $t_1$ to the secure computing apparatus 21C. The other transforming apparatuses $20_2$ to $20_N$ perform the same operation as the transforming apparatus $20_1$ (step E2-1).

The secure computing apparatus 21C generates data Wb associated with each bit b of the segments $t_n$ received from the transforming apparatuses $20_1$ to $20_N$ and data W(1-b) associated with an inversion bit (1-b) of each bit b. Then, the output part 21CC of the secure computing apparatus 21C transmits data W including the data Wb and the data W(1-b) to the secure computing apparatus 21B and the data Wb to the secure computing apparatus 21A without identifying the association between the bit b and the inversion bit (1-b) and the data Wb and the data W(1-b) (step E2-2).

Using the segments $s_n$ received from the transforming apparatuses $20_1$ to $20_N$, the logic circuit function $f(x_1, \ldots, x_N)$ and the data W, the secure computing apparatus 21B generates data T, in which the logic circuit function $f(s_1 * X_1, \ldots, s_N * X_N)$ is concealed. The logic circuit function $f(s_1 * X_1, \ldots, s_N * X_N)$ is obtained by substituting the segments $s_n$ into the logic circuit function $f(x_1, \ldots, x_N)$. From the data T and the data Wb, the computation result $f(m_1, \ldots, m_N)$ of the logic circuit function $f(x_1, \ldots, x_N)$ for the input values $m_1$ to $m_N$ can be determined. The secure computing apparatus 21B transmits the data T to the secure computing apparatus 21A (step E2-3).

The secure computing apparatus 21A receives the data T and the data Wb. The secure computing apparatus 21A uses the data T and the data Wb to obtain the computation result $f(m_1, \ldots, m_N)$ (step E2-4, 5).

In the following, a specific example of an operation of the secure computing system 2 according to this embodiment will be described.

Figure 9:
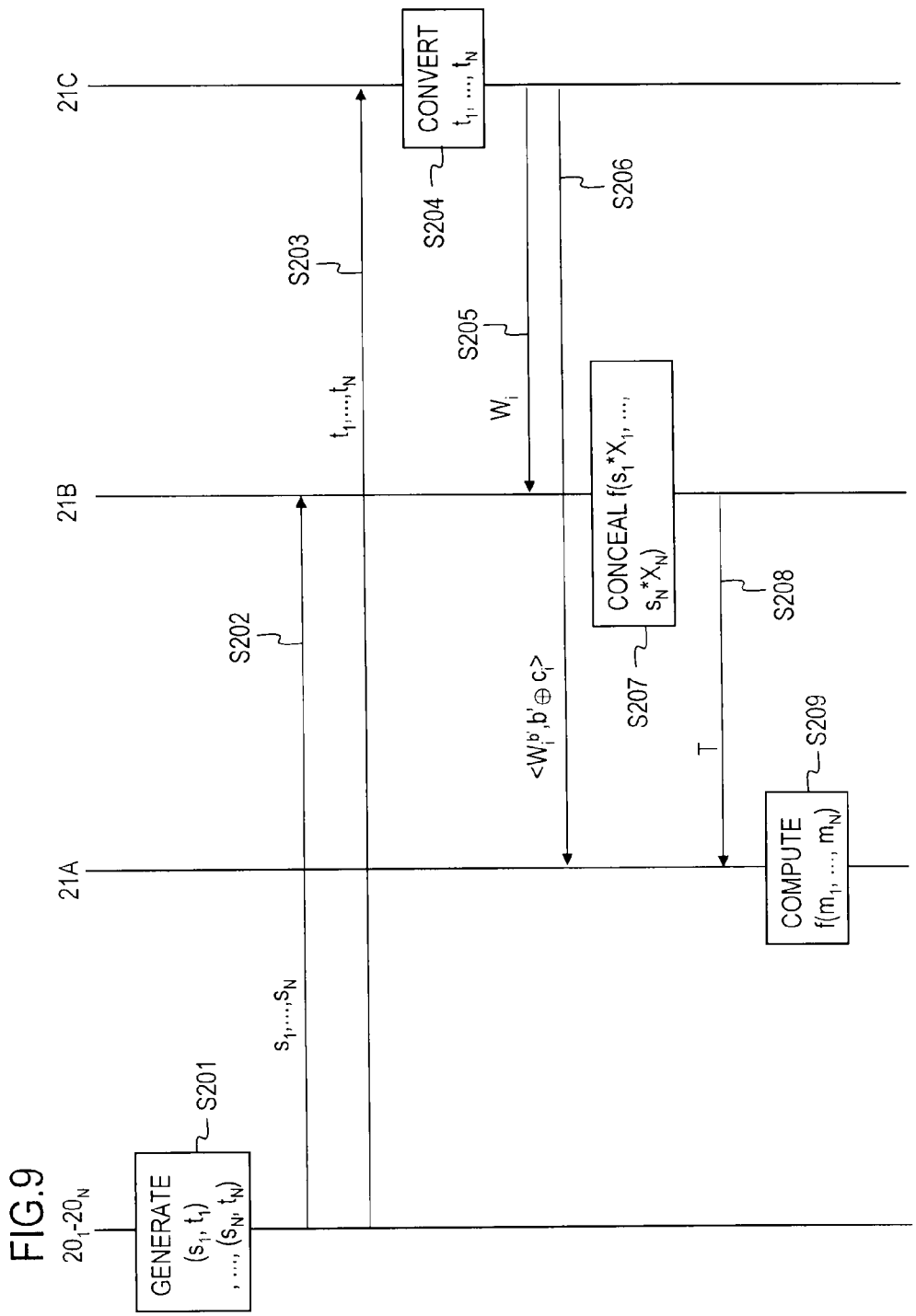
FIG. 9 is a sequence diagram showing a specific example of an operation of the secure computing system according to the second embodiment.

FIG. 9 is a sequence diagram showing a specific example of an operation of the secure computing system 2 according to the second embodiment.

[Step E2-1]

In this example, the operator * is the XOR operator. The dividing parts 20D in each transforming apparatus $20_1$ to $20_N$ divides the input value $m_n$ stored in the storage part 20A into random segments $s_n$ and $t_n$ that satisfy a relation $$m_n = s_n \oplus t_n$$

(step S201). Then, the output part 20C in each transforming apparatus $20_1$ to $20_N$ transmits the segment $s_n$ to the secure computing apparatus 21B (step S202) and transmits the segment $t_n$ to the secure computing apparatus 21C (step S203).

[Step E2-2]

For each input wire i associated with $X_n$ of $s_n*X_n$, which equals to $m_n$, of the logic circuit function $f(s_1*X_1, \ldots, s_N*X_N)$, the bit concealing part 21CD in the secure computing apparatus 21C generates data $$W_i = (\langle W_i^0, c_i \rangle, \langle W_i^1, \overline{c_i} \rangle),$$

which is a set of fixed-length random number data $W_i^0$ and a random bit $c_i$ and a set of fixed-length random number data $W_i^1$ and an inversion bit of the random bit $c_i$ (this data is a specific example of the data W).

From the data $W_i$ generated as described above, the selecting part 21CE selects a set $$\langle W_i^{b'}, b' \oplus c_i \rangle$$

associated with each bit b' of the actual segment $t_n$ (step S204). The bit b' is a w-th lowest bit of the segment $t_n$ in the case where the input wire i is the w-th lowest bit of the segment $t_n$.

$$\langle W_i^{b'}, b' \oplus c_i \rangle$$

is a specific example of the data Wb.

Then, the output part 21CC in the secure computing apparatus 21C transmits the data $W_i$ to the secure computing apparatus 21B (step S205) and transmits $$\langle W_i^{b'}, b' \oplus c_i \rangle$$

to the secure computing apparatus 21A (step S206).

[Step E2-3]

The secure computing apparatus 21B conceals the logic circuit function $f(s_1*X_1, \ldots, s_N*X_N)$, which is the logic circuit function $f(x_1, \ldots, x_N)$ in which the segments $s_n$ are substituted, by performing the following steps (a) to (d). The logic circuit function $f(s_1*X_1, \ldots, s_N*X_N)$ in this example, which is the logic circuit function $f(x_1, \ldots, x_N)$ in which the segments $s_n$ are substituted, is a function that includes a function $m_n = s_n * X_n$ for reconstructing $m_n$ from the input segment $X = t_n$ and the logic circuit function $f(x_1, \ldots, x_N)$ and substitutes the output value $m_n$ of each function $m_n = s_n * X_n$ into the logic circuit function $f(x_1, \ldots, x_N)$ to output the computation result $f(m_1, \ldots, m_N)$. By the following procedure, each logic gate constituting the logic circuit function $f(s_1*X_1, \ldots, s_N*X_N)$ is concealed.

(a) The bit concealing part 21BD in the secure computing apparatus 21B generates fixed-length random numbers $$W_i^0, W_i^1$$

for each wire i of the logic circuit function $f(s_1*X_1, \ldots, s_N*X_N)$ and associates the fixed-length random numbers with 0 and 1, respectively. However, for a logic gate constituting the function $m_n = s_n * X_n$, an input wire that is a bit of the segment $X_n = t_n$ is associated with $$W_i^0, W_i^1$$

received from the secure computing apparatus 21C.

(b) Then, the bit concealing part 21BD in the secure computing apparatus 21B generates a random bit $c_i$. However, for a logic gate constituting the function $m_n = s_n * X_n$, the random bit $c_i$ received from the secure computing apparatus 21C is used for an input wire that is a bit of the segment $X_n = t_n$. Therefore, for the input wire that is a bit of the segment $X_n = t_n$, no random bit $c_i$ is newly generated.

(c) Furthermore, the bit concealing part 21BD in the secure computing apparatus 21B associates $$(\langle W_i^0, c_i \rangle, \langle W_i^1, \overline{c_i} \rangle)$$

with each wire i. However, a wire i associated with a w-th lowest bit of the segment $s_n$ is associated with $$(\langle W_i^b, b \oplus c_i \rangle, \langle W_i^{\overline{b}}, \overline{b} \oplus c_i \rangle).$$

In this expression, b represents the w-th lowest bit of the segment $s_n$.

(d) Then, for a logic gate g that receives i and j as input wires and provides k as an output wire, the function concealing part 21BF in the secure computing apparatus 21B generates four pieces of labeled data $$c_i, c_j : (W_k^{g(0,0)}, g(0,0) \oplus c_k) \oplus F_{W_i^0}(c_j) \oplus F_{W_j^0}(c_i),$$

$$c_i, \overline{c_j} : (W_k^{g(0,1)}, g(0,1) \oplus c_k) \oplus F_{W_i^0}(\overline{c_j}) \oplus F_{W_j^1}(c_i),$$

$$\overline{c_i}, c_j : (W_k^{g(1,0)}, g(1,0) \oplus c_k) \oplus F_{W_i^1}(c_j) \oplus F_{W_j^0}(\overline{c_i}),$$

$$\overline{c_i}, \overline{c_j} : (W_k^{g(1,1)}, g(1,1) \oplus c_k) \oplus F_{W_i^1}(\overline{c_j}) \oplus F_{W_j^1}(\overline{c_i}),$$

and arranges the four pieces of labeled data in a random order to generate data $T_g$. A set T of the data $T_g$ is data in which the logic circuit function $f(s_1*X_1, \ldots, s_N*X_N)$ is concealed (step S207).

The output part 21BC in the secure computing apparatus 21B transmits the set T of the data $T_g$ to the secure computing apparatus 21A as data in which $f(s_1*X_1, \ldots, s_N*X_N)$ is concealed (step S208).

[Step E2-4]

The input part 21AB in the secure computing apparatus 21A receives the set T of the data $T_g$ and $$\langle W_i^{b'}, b' \oplus c_i \rangle$$

Using the data $T_g$ and $$\langle W_i^{b'}, b' \oplus c_i \rangle$$

the secure computing part 21AF in the secure computing apparatus 21A obtains the output wire $$\langle W_i^{\hat{b}}, \hat{b} \oplus c_i \rangle$$

of the last-stage logic gate g of the logic circuit function f.

[Step E2-5]

From $$\langle W_i^{\hat{b}}, \hat{b} \oplus c_i \rangle$$

the secure computing part 21AF in the secure computing apparatus 21A obtains a bit $$\hat{b}$$

of the computation result $f(m_1, \ldots, m_N)$ (step S209).

As described above, according to this embodiment, none of the secure computing apparatuses 21A, 21B and 21C has to perform the proxy 1-out-of-2 oblivious transfer protocol, which accounts for a large part of computation performed by the secure computing system according to the art described in Non-patent literature 3. Therefore, the load on the secure computing apparatuses 21A, 21B and 21C can be significantly reduced.

Since the secure computing apparatus 21C, which is added in this embodiment, receives only the segments $t_n$ of the input values $m_n$, the secure computing apparatus 21C does not compromise the confidentiality of the input values $m_n$.

Although XOR is used as an example of the operator * in this embodiment, the present invention is not limited thereto. The operator * may be any operator, such as the addition operator, the subtraction operator and the multiplication operator.

Furthermore, according to this embodiment, the segments $t_n$ produced by the transforming apparatuses $20_1$ to $20_N$ are transmitted to the secure computing apparatus 21C (step S203). However, the segments $t_n$ produced by the transforming apparatuses $20_1$ to $20_N$ may be first transmitted to the secure computing apparatus 21A and then transferred from the secure computing apparatus 21A to the secure computing apparatus 21C. Alternatively, the segments $t_n$ produced by the transforming apparatuses $20_1$ to $20_N$ may be transmitted to the secure computing apparatus 21A, and the secure computing apparatus 21A may perform steps S204 and S205 in this embodiment. In any case, the segments $t_n$ and $s_n$ are not input to the same secure computing apparatus at the same time without being concealed, and therefore, the confidentiality of the input values $m_n$ is not compromised.

In addition, according to this embodiment, the secure computing apparatus 21C that receives the segments $t_n$ generates the data $W_i$ and transmits the generated data $W_i$ to the secure computing apparatus 21B. However, the secure computing apparatus 21B may generate the data $W_i$ and transmit the generated data $W_i$ to the secure computing apparatus 21C.

Third Embodiment

A secure computing system according to a third embodiment comprises N transforming apparatuses (N represents a positive integer) and two secure computing apparatuses. The transforming apparatuses retain their respective independent input values. The secure computing system according to this embodiment obtains a computation result of a logic circuit function f for the input values while preventing the input value retained by each transforming apparatus from being known to the other apparatuses.

<Configuration>

Figure 10:
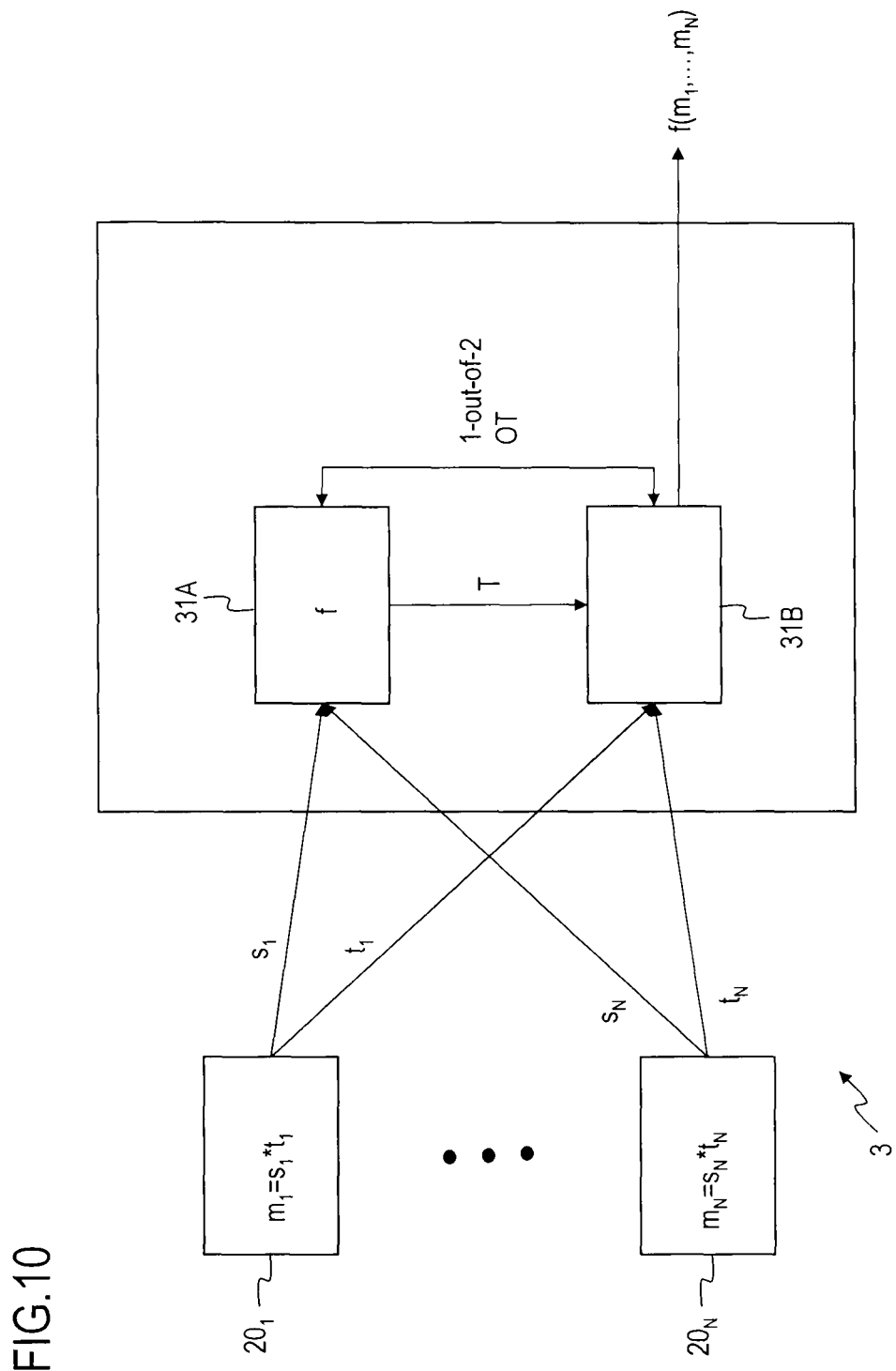
FIG. 10 is a block diagram showing a configuration of a secure computing system according to a third embodiment.
Figure 11A:
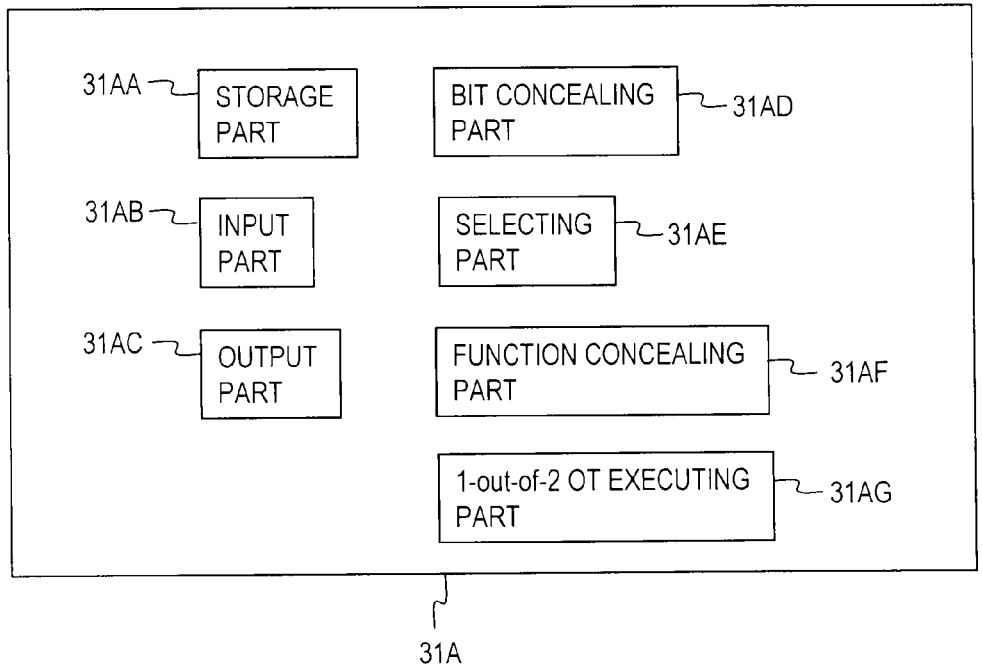
FIGS. 11A and 11B are block diagrams showing configurations of secure computing apparatuses included in the secure computing system according to the third embodiment.
Figure 11B:
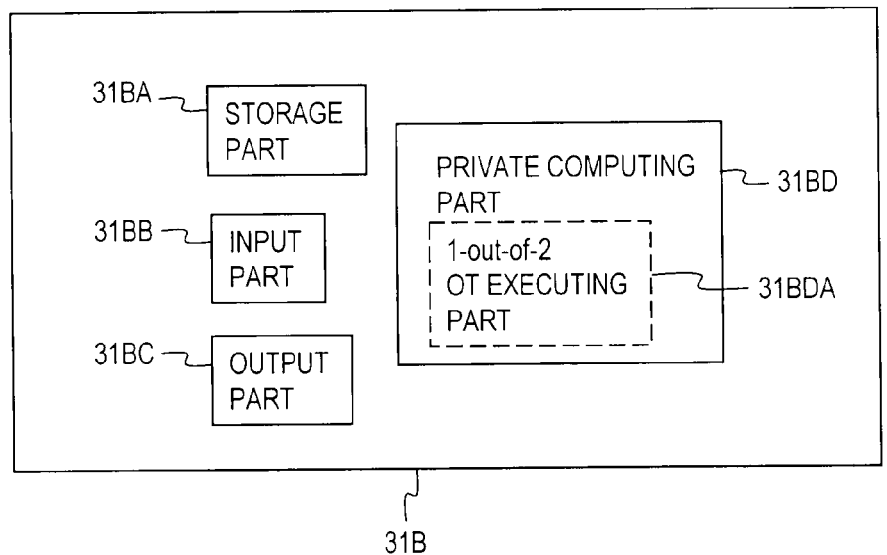

FIG. 10 is a block diagram showing a configuration of a secure computing system 3 according to the third embodiment. FIGS. 11A and 11B are block diagrams showing configurations of secure computing apparatuses 31A and 31B included in the secure computing system 3.

As shown in FIG. 10, the secure computing system 3 has transforming apparatuses $20_1$ to $20_N$ and the secure computing apparatuses 31A and 31B (a first and a second secure computing apparatus). As shown in FIG. 11A, the secure computing apparatus 31A has a storage part 31AA, an input part 31AB, an output part 31AC, a bit concealing part 31AD, a selecting part 31AE, a function concealing part 31AF, and a 1-out-of-2 OT EXECUTING part 31AG. As shown in FIG. 11B, the secure computing apparatus 31B has a storage part 31BA, an input part 31BB, an output part 31BC, and a secure computing part 31BD. The secure computing part 31BD includes a 1-out-of-2 OT executing part 31BDA. The transforming apparatuses $20_1$ to $20_N$ have the same configuration as that according to the second embodiment described above (see FIG. 8).

The secure computing apparatuses 31A and 31B may be implemented by loading a predetermined program into a well-known computer comprising a CPU, a RAM, a ROM, a communication device, an input interface, an output interface and the like, for example. The secure computing apparatuses 31A and 31B may include an integrated circuit.

<Processing>

A processing according to this embodiment is an example of the second aspect of the present invention described earlier. In this embodiment, as a pre-processing, input values $m_1$ to $m_N$ are stored in the storage part 20A of the transforming apparatuses $20_1$ to $20_N$, and a logic circuit function $f(x_1, \ldots, x_N)$ is stored in the storage part 31AA of the secure computing apparatus 31A. The secure computing system 3 according to this embodiment obtains a computation result $f(m_1, \ldots, m_N)$ of the logic circuit function $f(x_1, \ldots, x_N)$ for input values $m_n$ ($1 \leq n \leq N$) without letting the input values $m_1$ to $m_N$ retained by the transforming apparatuses $20_1$ to $20_N$ be known to the other apparatuses. In this process, the secure computing apparatuses 31A and 31B obtain the computation result $f(m_1, \ldots, m_N)$ without reconstructing the input values $m_n$ and obtaining data from which the input values $m_n$ can be easily reconstructed.

First, the transforming apparatus $20_1$ divides the input value $m_1$ into a segment $s_1$ and a segment $t_1$ that satisfy a relation $m_1 = s_1 * t_1$ for an operator * and transmits the segment $t_1$ to the secure computing apparatus 31A and the segment $s_1$ to the secure computing apparatus 31B. The other transforming apparatuses $20_2$ to $20_N$ perform the same operation as the transforming apparatus $20_1$ (step E3-1).

Using the logic circuit function $f(x)$ and the segments $t_n$ received from the transforming apparatuses $20_1$ to $20_N$, the secure computing apparatus 31A generates data T, in which the logic circuit function $f(X_1*t_1, \ldots, X_N*t_N)$ is concealed. The logic circuit function $f(X_1*t_1, \ldots, X_N*t_N)$ is obtained by substituting the segments $t_n$ into the logic circuit function $f(x)$. From the data T and the segments $s_n$, the computation result $f(m_1, \ldots, m_N)$ can be determined. The secure computing apparatus 31A transmits the data T to the secure computing apparatus 31B (step E3-2).

The secure computing apparatus 31B receives the segment $s_n$ and the data T. The secure computing apparatus 31B uses the segment $s_n$ and the data T to obtain the computation result $f(m_1, \ldots, m_N)$. The secure computing apparatus 31B receives the segments $s_n$ and determines the computation result $f(m_1, \ldots, m_N)$ from the data $T_g$ without actually reconstructing the input values $m_n$ (step E3-3, 4, 5).

In the following, a specific example of an operation of the secure computing system 3 according to this embodiment will be described.

Figure 12:
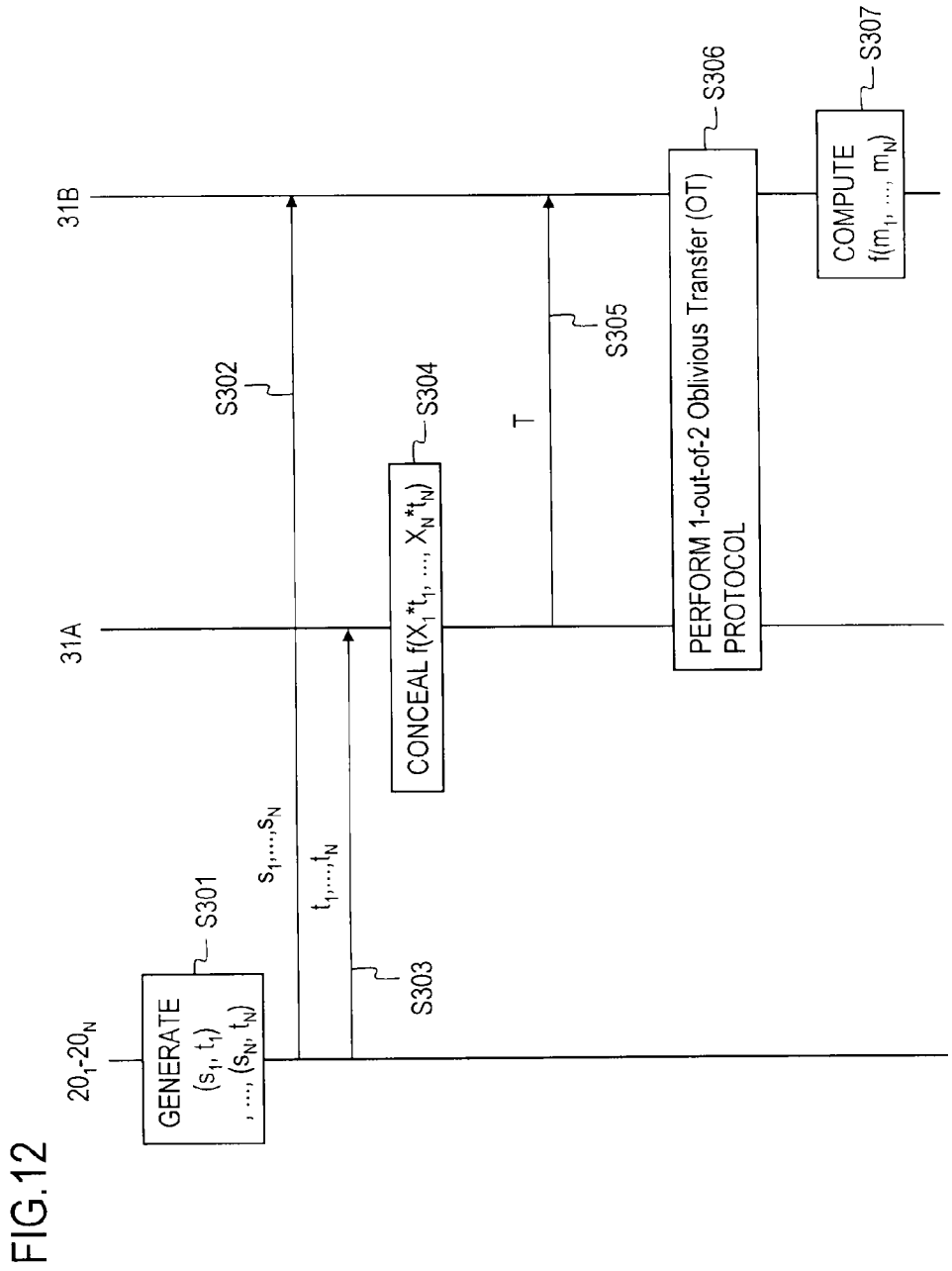
FIG. 12 is a sequence diagram showing a specific example of an operation of the secure computing system according to the third embodiment.

FIG. 12 is a sequence diagram showing a specific example of an operation of the secure computing system 3 according to the third embodiment.

[Step E3-1]

The dividing parts 20D in each transforming apparatus $20_1$ to $20_N$ divides the input value $m_n$ stored in the storage part 21A into random segments $s_n$ and $t_n$ that satisfy a relation $$m_n = s_n \oplus t_n$$

(step S301). Then, the output part 20C in each transforming apparatus $20_1$ to $20_N$ transmits the segment $s_n$ to the secure computing apparatus 31B (step S302) and transmits the segment $t_n$ to the secure computing apparatus 31A (step S303).

[Step E3-2]

The secure computing apparatus 31A conceals the logic circuit function $f(X_1 * t_1, \ldots, X_N * t_N)$, which is obtained by substituting the segments $t_n$ into the logic circuit function $f(x_1, \ldots, x_N)$, by performing the following steps (a) to (d). The logic circuit function $f(X_1 * t_1, \ldots, X_N * t_N)$ in this example, which is obtained by substituting the segments $t_n$ into the logic circuit function $f(x_1, \ldots, x_N)$, is a function that includes a function $m_n = X_n * t_n$ for reconstructing $m_n$ from the input segment $X = s_n$ and the logic circuit function $f(x_1, \ldots, x_N)$ and substitutes the output value $m_n$ of each function $m_n = X_n * t_n$ into the logic circuit function $f(x_1, \ldots, x_N)$ to output the computation result $f(m_1, \ldots, m_N)$. By the following procedure, each logic gate constituting the logic circuit function $f(X_1 * t_1, \ldots, X_N * t_N)$ is concealed.

(a) The bit concealing part 31AD in the secure computing apparatus 31A generates fixed-length random numbers $$W_i^0, W_i^1$$

for each wire i of each logic gate of the logic circuit function $f(X_1 * t_1, \ldots, X_N * t_N)$ and associates the fixed-length random numbers with 0 and 1, respectively.

(b) The bit concealing part 31AD in the secure computing apparatus 31A generates a random bit $c_i \in \{0, 1\}$.

(c) The bit concealing part 31AD in the secure computing apparatus 31A associates $$(\langle W_i^0, c_i \rangle, \langle W_i^1, \bar{c}_i \rangle)$$

with each wire i. However, a wire i associated with a w-th lowest bit of the segment $t_n$ is associated with $$(\langle W_i^{b_w}, b_w \oplus c_i \rangle, \langle W_i^{\bar{b}_w}, \bar{b}_w \oplus c_i \rangle).$$

In this expression, $b_w$ represents the w-th lowest bit of the segment $t_n$.

(d) For a logic gate g that receives i and j as input wires and provides k as an output wire, the function concealing part 31AF in the secure computing apparatus 31A generates four pieces of labeled data $$c_i, c_j : (W_k^{g(0,0)}, g(0,0) \oplus c_k) \oplus F_{W_i^0}(c_j) \oplus F_{W_j^0}(c_i),$$

$$c_i, \bar{c}_j : (W_k^{g(0,1)}, g(0,1) \oplus c_k) \oplus F_{W_i^0}(\bar{c}_j) \oplus F_{W_j^1}(c_i),$$

$$\bar{c}_i, c_j : (W_k^{g(1,0)}, g(1,0) \oplus c_k) \oplus F_{W_i^1}(c_j) \oplus F_{W_j^0}(\bar{c}_i),$$

$$\bar{c}_i, \bar{c}_j : (W_k^{g(1,1)}, g(1,1) \oplus c_k) \oplus F_{W_i^1}(\bar{c}_j) \oplus F_{W_j^1}(\bar{c}_i),$$

and arranges the four pieces of labeled data in a random order to generate data $T_g$. A set T of the data $T_g$ is data in which the logic circuit function $f(X_1 * t_1, \ldots, X_N * t_N)$ is concealed (step S304).

The output part 31AC in the secure computing apparatus 31A transmits the set T of the data $T_g$ to the secure computing apparatus 31B as data in which the logic circuit function $f(X_1 * t_1, \ldots, X_N * t_N)$ is concealed (step S305).

[Step E3-3]

The input part 31BB in the secure computing apparatus 31B receives the segments $s_n$ from the transforming apparatuses $20_1$ to $20_N$. The secure computing part 31BD in the secure computing apparatus 31B uses the segments $s_n$ to determine $$\langle W_i^b, b \oplus c_i \rangle$$

for each bit b of the segments $s_n$. However, $W_i^b$ and $c_i$ are set by the secure computing apparatus 31A, and therefore, the secure computing apparatus 31B cannot set $W_i^b$ and $c_i$ associated with each bit b of the segments $s_n$ by itself. On the other hand, if information about each bit b of the segments $s_n$ is given to the secure computing apparatus 31A in order to obtain $W_i^b$ and $c_i$ associated with each bit b of the segments $s_n$ from the secure computing apparatus 31A, the secure computing apparatus 31A becomes able to reconstruct the input values $m_n$. Thus, the 1-out-of-2 OT executing part 31BDA of the secure computing part 31BD in the secure computing apparatus 31B performs the 1-out-of-2 oblivious transfer protocol with the 1-out-of-2 OT executing part 31AG in the secure computing apparatus 31A, thereby obtaining $W_i^b$ and $c_i$ associated with each bit b of the segments $s_n$ from the secure computing apparatus 31A without giving the information about each bit b of the segments $s_n$ to the secure computing apparatus 31A. In the following, an example of this processing will be described.

[Example of 1-Out-of-2 Oblivious Transfer Protocol]

<Setting of Parameter>

The 1-out-of-2 OT executing part 31BDA and the 1-out-of-2 OT executing part 31AG cooperate with each other to generate a prime number p, determine an integer h equal to or greater than 2 and smaller than p, and determine a minimum natural number q that satisfy a relation $h^q \equiv 1 \pmod{p}$. In addition, the 1-out-of-2 OT executing part 31BDA and the 1-out-of-2 OT executing part 31AG cooperate to select another integer z equal to or greater than 2 and smaller than p. The prime number p, the natural number q and the integers h and z thus determined are stored in the storage part 31AA in the secure computing apparatus 31A and the storage part 31BA in the secure computing apparatus 31B, for example.

<Setting of Private Key>

The 1-out-of-2 OT executing part 31BDA randomly selects a natural number u smaller than q. The natural number u is a private key.

<Setting of Public Key>

The 1-out-of-2 OT executing part 31BDA randomly selects a natural number u smaller than q. The natural number u is a private key. The 1-out-of-2 OT executing part 31BDA computes $PK_b = h^u \bmod p$. The $PK_b$ is a public key, and a ciphertext encrypted with the private key u can be correctly decrypted with the public key $PK_b$.

<Modification of Public Key>

If b=1, the 1-out-of-2 OT executing part 31BDA computes $$PK_{\bar{b}} = z/PK_b \bmod p.$$

<Transmission of Public Key>

The output part 31BC in the secure computing apparatus 31B transmits the public key $PK_0$ to the secure computing apparatus 31A. If b=0, $PK_0$ is the correct public key for the natural number u. However, if b=1, $PK_0$ is not the correct public key for the natural number u, and $PK_1$, which is determined according to $PK_1 = z/PK_0 \bmod p$, is the correct public key for the natural number u.

<Encryption>

The 1-out-of-2 OT executing part 31AG in the secure computing apparatus 31A computes $PK_1$ using the received $PK_0$ according to $PK_1=z/PK_0$ mod p and then computes ciphertexts $Z_0$ and $Z_1$ according to $$Z_0=E_{PK_0}(C(\langle W_i^0, c_i \rangle)), Z_1 E_{PK_1}(C(\langle W_i^1, \overline{c_i} \rangle)).$$

The output part 31AC in the secure computing apparatus 31A transmits the ciphertexts $Z_0$ and $Z_1$ to the secure computing apparatus 31B. In the above expression, $E_{PK}(x)$ represents an encryption function that encrypts a plain text x using a public key PK, and it is supposed that the resulting ciphertext can be decrypted with the decryption key u. In addition, C represents a function that allows determination of whether the plain text is properly reconstructed or not. The secure computing apparatus 31A cannot know which of the public keys $PK_0$ and $PK_1$ is the correct public key for the natural number u. Therefore, the secure computing apparatus 31A cannot know whether the secure computing apparatus 31A is to obtain data associated with the bit b=0 or data associated with the bit b=1.

<Decryption>

The 1-out-of-2 OT executing part 31BDA in the secure computing apparatus 31B decrypts the ciphertexts $Z_0$ and $Z_1$ using the decryption key u and obtains a decryption result $$\langle W_i^b, b \oplus c_i \rangle,$$

which is determined by the function C to be properly reconstructed. That is, if b=0, $PK_0$ is the correct public key for the natural number u, so that only the ciphertext $Z_0$ is properly reconstructed. On the other hand, if b=1, $PK_1$ is the correct public key for the natural number u, so that only the ciphertext $Z_1$ is properly reconstructed (step S306).

[Step E3-4]

The input part 31BB in the secure computing apparatus 31B receives the set T of the data $T_g$ and $$\langle W_i^b, b \oplus c_i \rangle.$$

Using the data $T_g$ and $$\langle W_i^b, b \oplus c_i \rangle,$$

the secure computing part 31BD in the secure computing apparatus 31B obtains the output wire $$\langle W_i^{\hat{b}}, \hat{b} \oplus c_i \rangle$$

of the last-stage logic gate in the logic circuit function f.

[Step E3-5]

From $$\langle W_i^{\hat{b}}, \hat{b} \oplus c_i \rangle$$

the secure computing part 31BD in the secure computing apparatus 31B obtains a bit $$\hat{b}$$

of the computation result $f(m_1, \ldots, m_N)$ (step S307).

According to this embodiment, the transforming apparatuses $20_1$ to $20_N$ have only to divide the retained data $m_n$ into the segments $s_n$ and $t_n$ and transmit the segment $s_n$ to the secure computing apparatus 31B and the segment $t_n$ to the secure computing apparatus 31A and do not have to perform the proxy 1-out-of-2 oblivious transfer protocol. Therefore, compared with the method using the protocol disclosed in Non-patent literature 3, the load on the transforming apparatuses $20_1$ to $20_N$ is reduced.

In this embodiment, the secure computing apparatus 31B obtains concealing data $$\langle W_i^b, b \oplus c_i \rangle$$

for each bit b of the segment $s_n$ as data associated with each bit b.

However, the secure computing apparatus 31B may obtain concealing data associated with each bit r of the input value $m_n = s_n * t_n$ as data associated with each bit b of the segment $s_n$. In the case where the operator * is XOR, this arrangement can be achieved by using the ciphertexts $Z_0$ and $Z_1$ described below instead of the ciphertexts $Z_0$ and $Z_1$ described above. In the following expression, v represents a bit of the segment $t_n$.

$$Z_0=E_{Pk_0}(C(\langle W_i^v, v \oplus c_i \rangle)), Z_1 E_{PK_1}(C(\langle W_i^{\overline{v}}, \overline{v} \oplus c_i \rangle)).$$

This is based on the fact that when a bit b of the segment $s_n$ is 0, the bit r of the input value $m_n = S_n * t_n$ in the same digit place as the bit b equals to the bit v of the segment $t_n$ in the same digit place as the bit b, and when a bit b of the segment $s_n$ is 1, the bit r of the input value $m_n = s_n * t_n$ in the same digit place as the bit b is an inversion bit of the bit v of the segment $t_n$ in the same digit place as the bit b. In this case, the secure computing apparatus 31B obtains any one of $$\langle W_i^v, v \oplus c_i \rangle \ (b=0)$$

$$\langle W_i^v, \overline{v} \oplus c_i \rangle \ (b=1)$$

If the set T of the data $T_g$ associated this data, the computation result $f(m_1, \ldots, m_N)$ can be obtained from the data.

In addition, although XOR is used as an example of the operator * in this embodiment, the present invention is not limited thereto. The operator * may be any operator, such as the addition operator, the subtraction operator and the multiplication operator.

Fourth Embodiment

A secure computing system according to a fourth embodiment comprises N transforming apparatuses (N represents a positive integer) and two secure computing apparatuses. Each transforming apparatus retains an independent input value. The secure computing system according to this embodiment obtains a computation result of a logic circuit function f for the input values retained by the transforming apparatus without letting the input values be known to the other apparatuses. However, according to this embodiment, the 1-out-of-2 oblivious transfer protocol is not used.

<Configuration>

Figure 13:
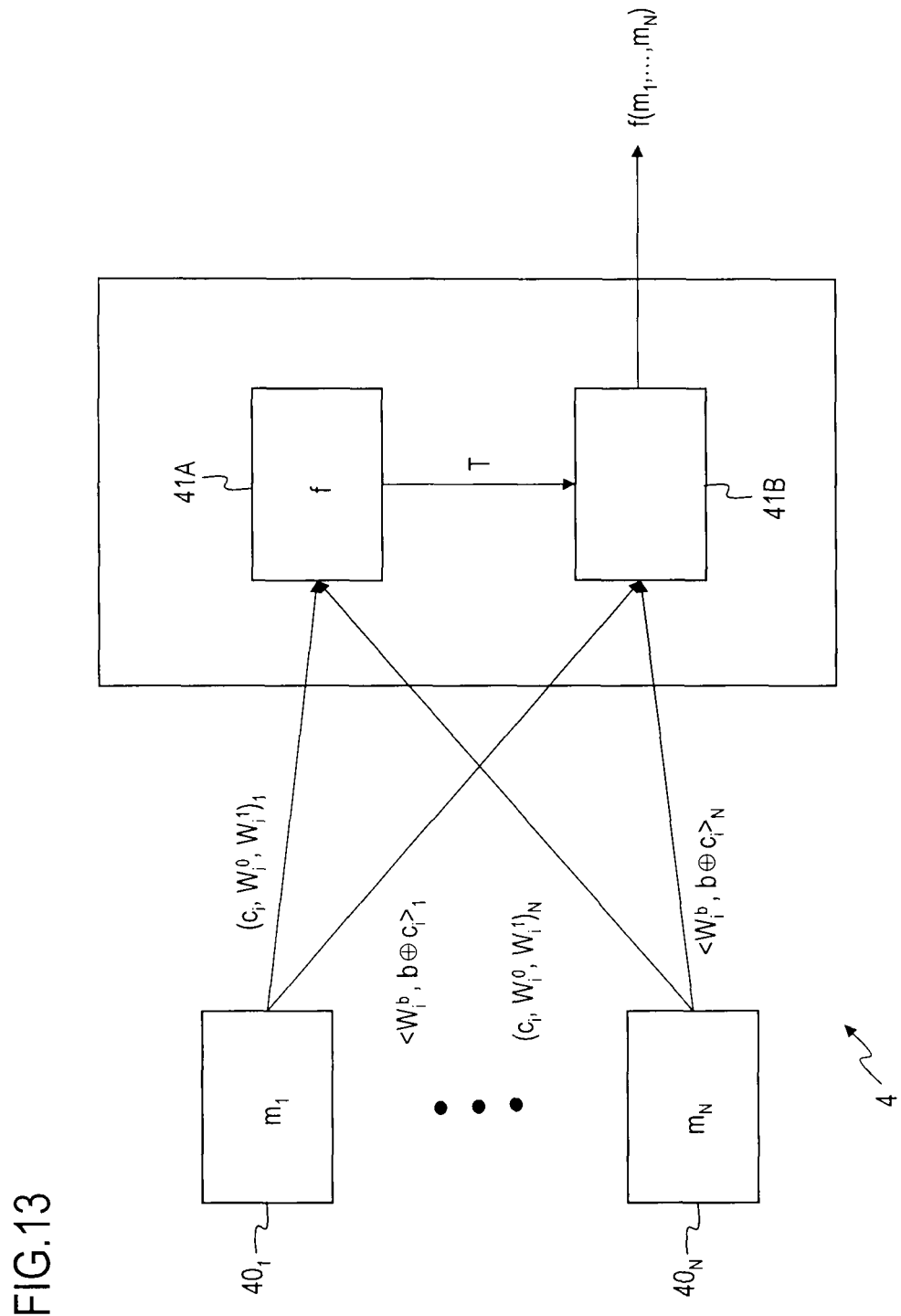
FIG. 13 is a block diagram showing a configuration of a secure computing system according to a fourth embodiment.
Figure 14A:
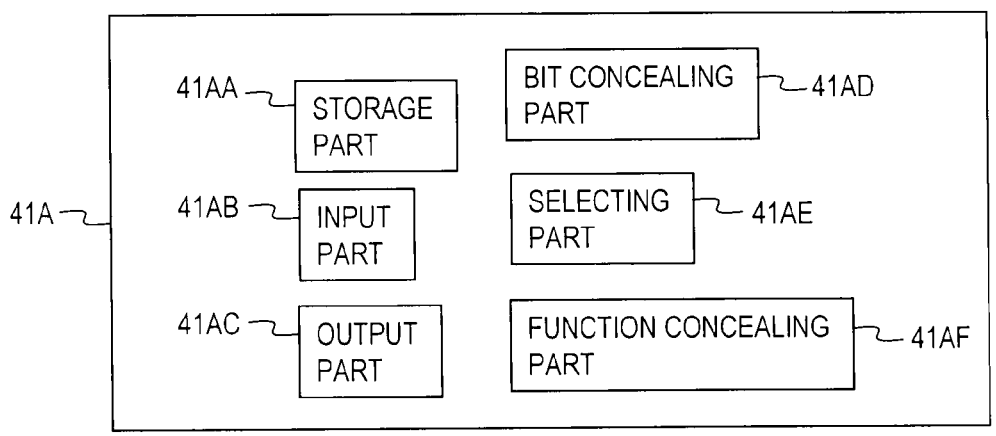
FIGS. 14A and 14B are block diagrams showing configurations of secure computing apparatuses included in the secure computing system.
Figure 14B:
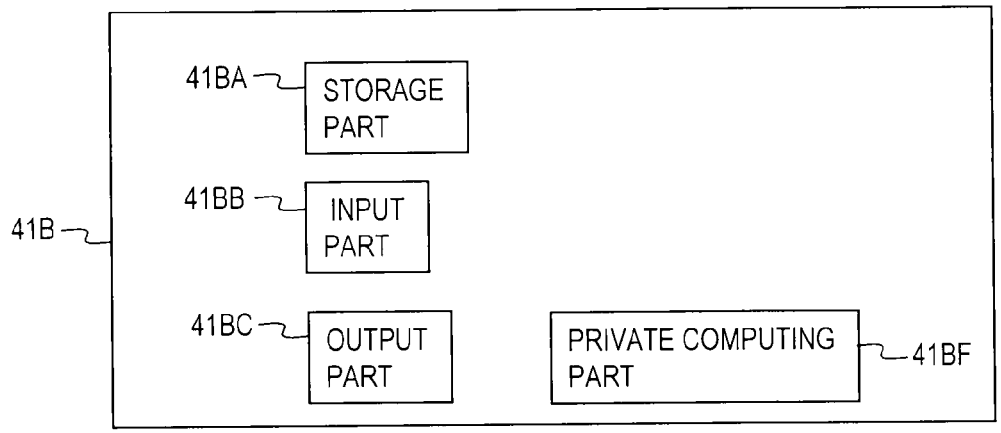
Figure 15:
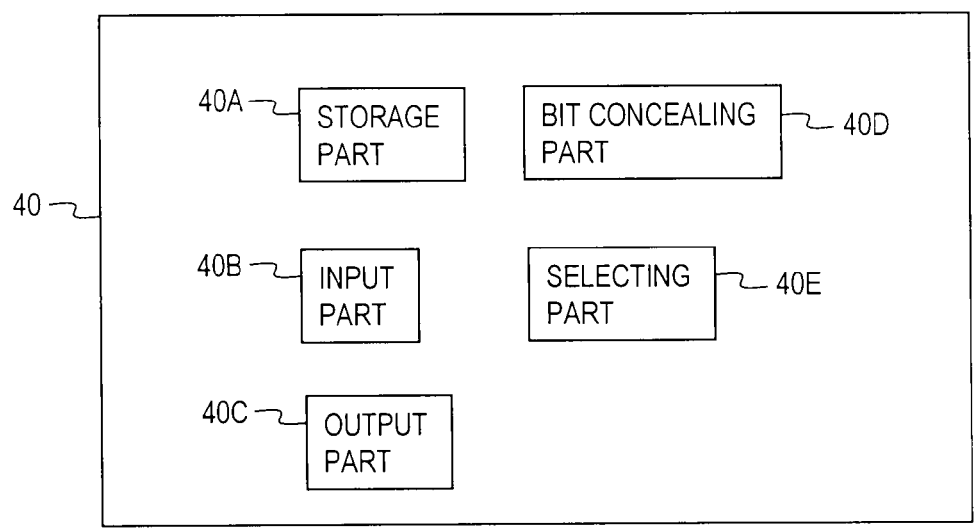
FIG. 15 is a block diagram showing a configuration of a transforming apparatus included in the secure computing system.

FIG. 13 is a block diagram showing a configuration of a secure computing system 4 according to the fourth embodiment. FIGS. 14A and 14B are block diagrams showing configurations of secure computing apparatuses 41A and 41B included in the secure computing system 4. FIG. 15 is a block diagram showing a configuration of transforming apparatus $40_1$ to $40_N$ included in the secure computing system 4. Note that a transforming apparatus 40 is a representative of the transforming apparatuses $40_1$ to $40_N$.

As shown in FIG. 13, the secure computing system 4 has transforming apparatuses $40_1$ to $40_N$ and the secure computing apparatuses 41A and 41B (a first and a second secure computing apparatus). As shown in FIG. 14A, the secure computing apparatus 41A has a storage part 41AA, an input part 41AB, an output part 41AC, a bit concealing part 41AD, and a function concealing part 41AF. As shown in FIG. 14B, the secure computing apparatus 41B has a storage part 41BA, an input part 41BB, an output part 41BC, and a secure computing part 41BF. As shown in FIG. 15, each transforming apparatus 40 has a storage part 40A, an input part 40B, an output part 40C, a bit concealing part 40D, and a selecting part 40E.

The secure computing apparatuses 41A and 41B and the transforming apparatus 40 may be implemented by loading a predetermined program into a well-known computer comprising a CPU, a RAM, a ROM, a communication device, an input interface, an output interface and the like, for example. The secure computing apparatuses 41A and 41B and the transforming apparatus 40 may include an integrated circuit.

<Processing>

A processing according to this embodiment is an example of the second aspect of the present invention described earlier. In this embodiment, as a pre-processing, input values $m_1$ to $m_N$ are stored in the storage part 40A of the transforming apparatuses $40_1$ to $40_N$, and a logic circuit function $f(x_1, \ldots, x_N)$ is stored in the storage part 41AA of the secure computing apparatus 41A. The secure computing system 4 according to this embodiment obtains a computation result $f(m_1, \ldots, m_N)$ of the logic circuit function $f(x_1, \ldots, x_N)$ for input values $m_n$ ($1 \leq n \leq N$) without letting the input values $m_1$ to $m_N$ retained by the transforming apparatuses $40_1$ to $40_N$ be known to the other apparatuses. In this process, the secure computing apparatuses 41A and 41B obtain the computation result $f(m_1, \ldots, m_N)$ without reconstructing the input values $m_n$ and obtaining data from which the input values $m_n$ can be easily reconstructed. In addition, in the process, the 1-out-of-2 oblivious transfer protocol does not have to be performed.

First, the transforming apparatuses $40_1$ to $40_N$ generate data Wb associated with each bit b of their respective input values $m_1$ to $m_N$ and data W(1-b) associated with an inversion bit (1-b) of each bit b. Then, the transforming apparatuses $40_1$ to $40_N$ transmit the data Wb to the secure computing apparatus 41B as one of the segments of their respective input values $m_1$ to $m_N$. In addition, the transforming apparatuses $40_1$ to $40_N$ transmit data W to the secure computing apparatus 41A as the other segment, and the data W includes the data Wb and the data W(1-b) associated with the inversion bit (1-b) of each bit b without identifying the association between the data Wb and the data W(1-b) and the bit b and the bit (1-b) (step E4-1).

Using the data W, the secure computing apparatus 41A generates data T in which the logic circuit function f is concealed. From the data T and the data Wb, the computation result f(m) can be determined. The secure computing apparatus 41A transmits the generated data T to the secure computing apparatus 41B (step E4-2).

The secure computing apparatus 41A receives the data T and the data Wb. The secure computing apparatus 41A uses the data T and the data Wb to obtain the computation result f(m) (step E4-3, 4, 5).

In the following, a specific example of an operation of the secure computing system 4 according to this embodiment will be described.

FIG. 16 is a sequence diagram showing a specific example of an operation of the secure computing system 4 according to the fourth embodiment.

[Step E4-1]

Of a logic gate constituting the logic circuit function $f(x_1, \ldots, x_N)$, for an input wire i that is a bit b of each input value $m_1$ to $m_N$, the bit concealing part 40D in the transforming apparatuses $40_1$ to $40_N$ generates a random bit $c_i$ and fixed-length random numbers $W_i^0, W_i^1$.

Then, the bit concealing part 40D in each transforming apparatus $40_n$ generates data $W_n = (c_i, W_i^0, W_i^1)_n$ (an example of the data W) (step S401). The selecting part 40E in each transforming apparatus $40_n$ generates data $\langle W_i^b, b \oplus c_i \rangle_n$ associated with each bit b (an example of the data Wb) (step S402). The output part 40C in each transforming part $40_n$ transmits the data $W_n$ to the secure computing apparatus 41B (step S403) and transmits the data $\langle W_i^b, b \oplus c_i \rangle_n$ to the secure computing apparatus 41A (step S404).

[Step E4-2]

The function concealing part 41AF in the secure computing apparatus 41A generates a set T of data $T_g$ in which the logic gates of the logic circuit function $f(x_1, \ldots, x_N)$ are concealed by performing the following steps (a) to (d) as in step E3-2 described above. However, an input wire i of each bit of the input values $m_1$ to $m_n$ is associated with $(\langle W_i^0, c_i \rangle, \langle W_i^1, \overline{c_i} \rangle)$ (step S405).

The output part 41AC in the secure computing apparatus 41A transmits the set T of the data $T_g$ to the secure computing apparatus 41B as data in which the logic circuit function $f(x_1, \ldots, x_N)$ is concealed (step S406).

[Step E4-3]

The input part 41 BF in the secure computing apparatus 41B receives the set T of the data $T_g$ and $\langle W_i^b, b \oplus c_i \rangle_n$.

The secure computing part 41BF in the secure computing apparatus 41B uses the data $T_g$ and $\langle W_i^b, b \oplus c_i \rangle_n$ to obtain the output wire $\langle W_i^b, \hat{b} \oplus c_i \rangle$ of the last-stage logic gate g of the logic circuit function f.

[Step E4-5]

From $\langle W_i^b, \hat{b} \oplus c_i \rangle$, the secure computing part 41BD in the secure computing part 41B obtains a bit $\hat{b}$ of the computation result $f(m_1, \ldots, m_N)$ (step S407).

According to this embodiment, since the 1-out-of-2 oblivious transfer protocol does not have to be performed, the processing load on the secure computing apparatuses 41A and 41B is reduced compared with the third embodiment.

In addition, the data $W_n = (c_i, W_i^0, W_i^1)_n$ transmitted from each transforming apparatus $40_n$ to the secure computing apparatus 41A does not contain information about the input values $m_n$. In addition, since the bit b of the input value $m_n$ is masked by the random bit $c_i$, $\langle W_i^b, b \oplus c_i \rangle_n$ transmitted from each transforming apparatus $40_n$ to the secure computing apparatus 41B Provides No Significant Information about the Input values $m_n$. As a result, both the secure computing apparatuses 41A and 41B cannot obtain significant information about the input values $m_n$ from their respective received information alone, and the confidentiality of the input values $m_n$ is ensured.

[Modifications]

The present invention is not limited to the embodiments described above. For example, the configuration of the logic circuit function in which the input values or segments are concealed is not limited to those described above. The various processings described above may not be sequentially performed in the order described above but may be performed in parallel or separately depending on the processing capability of the processing apparatus or other necessities. The term "system" used herein refers to a logical set of a plurality of apparatuses. In addition, the apparatuses are not always located in one housing. Of course, other various modifications can be appropriately made without departing from the spirit of the present invention.

In the case where the configurations described above are implemented by a computer, the processing capability of each apparatus is described in a program. And the computer provides the processing capability by executing the program.

The program that describes the processing can be recorded in a computer-readable recording medium. The computer-readable recording medium may be a magnetic recording device, an optical disk, a magneto-optical recording medium, a semiconductor memory or any other recording medium.

The program is distributed through selling, transfer, lending or the like of a portable recording medium, such as a DVD and a CD-ROM, in which the program is recorded, for example. Alternatively, the program may be stored in a storage device of a server computer and distributed by the server computer transferring the program to other computers over a network.

The computer that executes the program first stores the program recorded in a portable recording medium or transferred from a server computer in a storage device thereof, for example. When the computer performs the processing, the computer reads the program from the storage device thereof and performs the processing according to the read program. Alternatively, the computer may read the program directly from the portable recording medium and perform the processing according to the program. As a further alternative, the computer may perform the processing according to the program each time the computer receives a program transferred from the server computer. As a further alternative, the processing may be performed by on an application service provider (ASP) basis, in which the server computer does not transmit the program to the computer, and the capability is implemented only through execution instruction and result acquisition.

INDUSTRIAL APPLICABILITY

The present invention can be applied to a wide variety of systems that uses personal information while protecting privacy, for example. For example, the present invention can be applied to any information gathering system, such as an auction system. In this case, the result of the auction, the result of the majority decision result or the like can be obtained as the computation result without leakage of data retained by each user. Another application of the present invention is a system that gathers data from each user and performs various statistical or mining processings without letting the data gathered from each user be known to the other users, for example. A further application of the present invention is a biological authentication system. In this case, whether the biological information is valid or not can be determined while concealing the biological information about each user.

What is claimed is:

1. A secure computing system that obtains a computation result $f(m)$ of a logic circuit function $f(x)$ for an input value m while concealing said input value m, comprising:

a first secure computing apparatus that stores said logic circuit function $f(x)$; and a second secure computing apparatus which is independent from said first secure computing apparatus, wherein said first secure computing apparatus includes:

a first receiver that receives a segment B of said input value m, said input value m having been divided into a segment A and said segment B; and a generator that uses said logic circuit function $f(x)$ and said segment B to generate data T in which said logic circuit function $f(x)$ and said segment B are concealed by concealing the specific logic gates used to achieve the logic circuit function $f(X*B)$ where * is an operator, with segment B as an input, when generating the data T, said input value m corresponding to said segment A and said segment B; and wherein said second secure computing apparatus includes:

a second receiver that receives said segment A and said data T; and a calculator that obtains said computation result $f(m)$ by using said segment A and said data T without using said segment B.

2. The secure computing system according to claim 1, wherein said segments A and B are segments s and t that satisfy a relation $m=s*t$ for an operator *, said generator uses said logic circuit function $f(x)$ and said segment t to generate data T in which a logic circuit function $f(X*t)$ is concealed, said logic circuit function $f(X*t)$ being obtained by substituting said segment t into said logic circuit function $f(x)$, said computation result $f(m)$ being determined from the data T and said segment s, and said calculator obtains said computing result $f(m)$ using said segment s and said data T.

3. The secure computing system according to claim 2, wherein said calculator obtains said computation result $f(m)$ using said segment s and said data T without reconstructing said input value m.

4. The secure computing system according to claim 3, wherein said calculator performs a 1-out-of-2 oblivious transfer protocol with said first secure computing apparatus to acquire concealing data associated with said segment s generated by said first secure computing apparatus without letting said segment s be known to said first secure computing apparatus; and obtains said computation result $f(m)$ using said concealing data and said data T.

5. The secure computing system according to claim 2, wherein said generator performs a 1-out-of-2 oblivious transfer protocol with said first secure computing apparatus to acquire concealing data associated with said segment s generated by said first secure computing apparatus without letting said segment s be known to said first secure computing apparatus, and obtains said computation result $f(m)$ using said concealing data and said data T.

6. The secure computing system according to any of claims 2 to 5, further comprising:

a transforming apparatus that includes:

a divider that divides said input value m into said segments s and t that satisfy a relation $m=s*t$;

a first transmitter that transmits said segment t to said first secure computing apparatus; and a second transmitter that transmits said segment s to said second secure computing apparatus.

7. The secure computing system according to claim 1, wherein said segment A is data Wb associated with each bit b of said input value m, said segment B is data W including said data Wb and data W(1-b) associated with an inversion bit (1-b) of said bit b without identifying the association between said data Wb and said data W(1-b) and said bit b and said bit (1-b), said generator uses said data W to generate said data T in which the logic circuit function f is concealed, said computation result f(m) being determined using the data T and said data Wb, and said obtains said computation result f(m) using said data Wb and said data T.

8. A secure computing apparatus, comprising:
a receiver that receives a segment B of said input value m, said input value m having been divided into a segment A and said segment B; and
a generator that uses a logic circuit function f(x) and said segment B to generate data T in which said logic circuit function f(x) and said segment B are concealed by concealing the specific logic gates used to achieve the logic circuit function f(X*B) where * is an operator, with segment B as an input, when generating the data T, said input value m corresponding to said segment A and said segment B; and
a transmitter that transmits said data T to another secure computing apparatus that receives said segment A;
wherein computation result f(m) can be determined by using said data T and said segment A without using said segment B.

9. A secure computing method that obtains a computation result f(m) of a logic circuit function f(x) for an input value m while concealing said input value m, comprising:
(A) a step of receiving a segment B of said input value m by a first secure computing apparatus, said input value m having been divided into a segment A and said segment B;
(B) a step of using said logic circuit function f(x) stored in said first secure computing apparatus and said segment B, by said first secure computing apparatus, to generate data T in which said logic circuit function f(x) and said segment B are concealed by concealing the specific logic gates used to achieve the logic circuit function f(X*B) where * is an operator, with segment B as an input, when generating the data T, said input value m corresponding to said segment A and said segment B;
(C) a step of receiving said segment A and said data T by a second secure computing apparatus which is independent from said first secure computing apparatus; and
(D) a step of obtaining said computation result f(m) by using said segment A and said data T by said second secure computing apparatus without using said segment B.

10. The secure computing method according to claim 9, wherein said segments A and B are segments s and t that satisfy a relation mA=s*t for an operator *,
said step (B) includes a step of using said logic circuit function f(x) and said segment t to generate data T in which a logic circuit function f(X*t) is concealed, said logic circuit function f(X*t) being obtained by substituting said segment t into said logic circuit function f(x), said computation result f(m) being determined from the data T and said segment s, and
said step (D) includes a step of obtaining said computing result f(m) using said segment s and said data T.

11. The secure computing method according to claim 9, wherein said step (D) includes a step of obtaining said computation result f(m) using said segment s and said data T without reconstructing said input value m.

12. The secure computing method according to claim 11, wherein said step (D) includes:
(D-1) a step of performing a 1-out-of-2 oblivious transfer protocol with said first secure computing apparatus to acquire concealing data associated with said segment s generated by said first secure computing apparatus without letting said segment s be known to said first secure computing apparatus, in said second secure computing apparatus; and
(D-2) a step of obtaining said computation result f(m) using said concealing data and said data T.

13. The secure computing method according to claim 10, wherein said step (D) includes:
(D-1) a step of performing a 1-out-of-2 oblivious transfer protocol with said first secure computing apparatus to acquire concealing data associated with said segment s generated by said first secure computing apparatus without letting said segment s be known to said first secure computing apparatus, in said second secure computing apparatus; and
(D-2) a step of obtaining said computation result f(m) using said concealing data and said data T.

14. The secure computing method according to any of claims 10 to 13, further comprising:
a step of dividing said input value m into said segments s and t that satisfy a relation m=s*t in a transforming apparatus;
a step of transmitting said segment t to said first secure computing apparatus from said transforming apparatus; and
a step of transmitting said segment s to said second secure computing apparatus from said transforming apparatus.

15. The secure computing method according to claim 9, wherein said segment A is data Wb associated with each bit of said input value m,
said segment B is data W including said data Wb and data W(1-b) associated with an inversion bit (1-b) of said bit b without identifying the association between said data Wb and said data W(1-b) and said bit b and said bit (1-b),
said step (B) includes a step of using said data W to generate said data T in which the logic circuit function f is concealed, said computation result f(m) being determined using the data T and said data Wb, and
said step (D) includes a step of obtaining said computation result f(m) using said data Wb and said data T.

16. A non-transitory computer readable medium that stores a program that makes a computer function as a secure computing apparatus according to claim 8.

* * * * *